United States Patent
Tsuda

(10) Patent No.: US 9,665,917 B2
(45) Date of Patent: May 30, 2017

(54) ELECTRIC POWER INFORMATION MANAGEMENT APPARATUS, ELECTRIC POWER INFORMATION MANAGEMENT SYSTEM, AND ELECTRIC POWER INFORMATION MANAGEMENT METHOD

(71) Applicant: MITSUBISHI ELECTRIC CORPORATION, Chiyoda-ku (JP)

(72) Inventor: Yoshiaki Tsuda, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/799,260

(22) Filed: Jul. 14, 2015

(65) Prior Publication Data

US 2015/0317755 A1 Nov. 5, 2015

Related U.S. Application Data

(62) Division of application No. 13/695,866, filed as application No. PCT/JP2010/072944 on Dec. 21, 2010, now Pat. No. 9,114,721.

(30) Foreign Application Priority Data

May 25, 2010 (JP) ................................ 2010-119250

(51) Int. Cl.
G06F 1/32 (2006.01)
G06Q 50/06 (2012.01)
(Continued)

(52) U.S. Cl.
CPC .............. *G06Q 50/06* (2013.01); *B60L 8/003* (2013.01); *B60L 11/1816* (2013.01);
(Continued)

(58) Field of Classification Search
CPC ........................................................ G06F 1/26
(Continued)

(56) References Cited

U.S. PATENT DOCUMENTS 6,975,937 B1 * 12/2005 Kantarjiev ............. G06Q 10/08
340/990
8,676,636 B2 * 3/2014 Genschel ............... G06Q 30/00
235/381

(Continued)

FOREIGN PATENT DOCUMENTS

JP 2002-015235 A 1/2002
JP 2004-129499 4/2004

(Continued)

OTHER PUBLICATIONS

Office Action issued Apr. 21, 2015 in Japanese Patent Application No. 2014-151447 (w/English translation).

(Continued)

*Primary Examiner* — Jaweed A Abbaszadeh
*Assistant Examiner* — Volvick Derose
(74) *Attorney, Agent, or Firm* — Oblon, McClelland, Maier & Neustadt, L.L.P.

(57) ABSTRACT

An electric power information management apparatus includes a power meter that measures electric power data on electric power to be supplied from a storage battery of a vehicle to an electric power facility; a security module that associates and encrypts identification information corresponding to the vehicle and the measured electric power data; a communication device that transmits to an electric power management database the identification information corresponding to the vehicle and the electric power data encrypted by the security module to store the electric power data associated with the identification information in the electric power management database; and an electric power (Continued)

control device that extracts necessary electric power from the electric power facility and supplies the electric power to the storage battery of the vehicle corresponding to the identification information, based on the electric power data stored in the electric power management database, being associated with the identification information.

5 Claims, 8 Drawing Sheets

(51) Int. Cl.
| | |
|---|---|
| B60L 11/18 | (2006.01) |
| G07C 5/00 | (2006.01) |
| B60L 8/00 | (2006.01) |
| H02J 3/00 | (2006.01) |
| H02J 3/32 | (2006.01) |
| H02J 13/00 | (2006.01) |
| G06F 13/28 | (2006.01) |
| G06F 1/26 | (2006.01) |

(52) U.S. Cl.
CPC ....... *B60L 11/1838* (2013.01); *B60L 11/1842* (2013.01); *B60L 11/1846* (2013.01); *B60L 11/1848* (2013.01); *B60L 11/1861* (2013.01); *B60L 11/1887* (2013.01); *G07C 5/008* (2013.01); *H02J 3/008* (2013.01); *H02J 3/32* (2013.01); *H02J 13/0062* (2013.01); *H02J 13/0075* (2013.01); *H02J 13/0079* (2013.01); *B60L 2250/10* (2013.01); *B60L 2250/16* (2013.01); *G06F 1/26* (2013.01); *G06F 13/28* (2013.01); *Y02B 90/2638* (2013.01); *Y02B 90/2653* (2013.01); *Y02E 60/721* (2013.01); *Y02E 60/722* (2013.01); *Y02E 60/7838* (2013.01); *Y02E 60/7853* (2013.01); *Y02T 10/7072* (2013.01); *Y02T 10/7083* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y02T 90/34* (2013.01); *Y04S 10/126* (2013.01); *Y04S 10/14* (2013.01); *Y04S 10/60* (2013.01); *Y04S 30/14* (2013.01); *Y04S 40/124* (2013.01); *Y04S 40/126* (2013.01); *Y04S 50/10* (2013.01)

(58) Field of Classification Search
USPC .......................................................... 713/300
See application file for complete search history.

(56) References Cited

U.S. PATENT DOCUMENTS

| | | | |
|---|---|---|---|
| 2002/0132144 A1 | 9/2002 | McArthur et al. | |
| 2004/0110044 A1* | 6/2004 | McArthur | B60L 11/184 |
| | | | 429/443 |
| 2008/0039979 A1 | 2/2008 | Bridges et al. | |
| 2008/0039980 A1 | 2/2008 | Pollack et al. | |
| 2008/0039989 A1* | 2/2008 | Pollack | B60L 11/1811 |
| | | | 701/22 |
| 2008/0040223 A1 | 2/2008 | Bridges et al. | |
| 2008/0040263 A1 | 2/2008 | Pollack et al. | |
| 2008/0040295 A1 | 2/2008 | Kaplan et al. | |
| 2008/0040296 A1 | 2/2008 | Bridges et al. | |
| 2008/0040479 A1* | 2/2008 | Bridge | B60L 3/12 |
| | | | 709/224 |
| 2008/0052145 A1* | 2/2008 | Kaplan | G06Q 10/0631 |
| | | | 705/7.12 |
| 2008/0281663 A1 | 11/2008 | Hakim et al. | |
| 2008/0294472 A1 | 11/2008 | Yamada | |
| 2008/0312782 A1 | 12/2008 | Berdichevsky et al. | |
| 2009/0021385 A1* | 1/2009 | Kelty | B60L 11/1824 |
| | | | 340/660 |
| 2009/0040029 A1* | 2/2009 | Bridges | G06Q 50/06 |
| | | | 340/12.37 |
| 2009/0043519 A1 | 2/2009 | Bridges et al. | |
| 2009/0043520 A1 | 2/2009 | Pollack et al. | |
| 2009/0063680 A1 | 3/2009 | Bridges et al. | |
| 2009/0066287 A1 | 3/2009 | Pollack et al. | |
| 2009/0144149 A1* | 6/2009 | Sakakibara | G06Q 10/10 |
| | | | 705/14.62 |
| 2009/0177595 A1* | 7/2009 | Dunlap | B60L 11/1824 |
| | | | 705/412 |
| 2009/0200988 A1* | 8/2009 | Bridges | G06Q 50/06 |
| | | | 320/137 |
| 2009/0306842 A1* | 12/2009 | Oyobe | B60L 7/18 |
| | | | 701/22 |
| 2010/0076825 A1 | 3/2010 | Sato et al. | |
| 2010/0211233 A1* | 8/2010 | Roscoe | H02J 3/008 |
| | | | 700/296 |
| 2010/0241560 A1* | 9/2010 | Landau-Holdsworth | B60L 3/0069 |
| | | | 705/39 |
| 2010/0274656 A1* | 10/2010 | Genschel | G06Q 30/00 |
| | | | 705/14.27 |
| 2010/0306033 A1* | 12/2010 | Oved | G06Q 10/06375 |
| | | | 705/7.37 |
| 2011/0007824 A1* | 1/2011 | Bridges | B60L 11/1842 |
| | | | 375/257 |
| 2011/0010158 A1* | 1/2011 | Bridges | B60L 11/1842 |
| | | | 703/18 |
| 2011/0025556 A1 | 2/2011 | Bridges et al. | |
| 2011/0245987 A1* | 10/2011 | Pratt | H01M 10/44 |
| | | | 700/295 |
| 2013/0043844 A1* | 2/2013 | Tashiro | B60L 15/2045 |
| | | | 320/128 |
| 2013/0200716 A1* | 8/2013 | Kesler | B60L 11/007 |
| | | | 307/104 |
| 2014/0100708 A1* | 4/2014 | Ukita | H02J 3/32 |
| | | | 700/297 |

FOREIGN PATENT DOCUMENTS

| | | |
|---|---|---|
| JP | 2005-185016 | 7/2005 |
| JP | 2005-267246 | 9/2005 |
| JP | 2006-215722 | 8/2006 |
| JP | 2007-20397 | 1/2007 |
| JP | 2007-252117 | 9/2007 |
| JP | 2007-282383 | 10/2007 |
| JP | 2009-80830 | 4/2009 |
| JP | 2009-134450 | 6/2009 |
| JP | 2009-183086 | 8/2009 |
| JP | 2010-81722 | 4/2010 |
| JP | 2010-512727 | 4/2010 |
| JP | 2011-036074 | 2/2011 |

OTHER PUBLICATIONS

Office Action issued Feb. 16, 2015 in Chinese Patent Application No. 201080066990.9 (w/partial English translation).
Office Action issued May 13, 2014 in Japanese Patent Application No. 2012-517090 (w/English translation of relevant portions).
Office Action issued May 13, 2014 in Japanese Patent Application No. 2012- 216120 (w/English translation of relevant portions).
International Search Report Issued Mar. 22, 2011 in PCT/JP1 0172944 filed Dec. 21, 2010.
Office Action mailed Nov. 5, 2013 in Japanese Application No. 2012-517090 (w/partial English translation).
Office Action mailed Nov. 5, 2013 in Japanese Application No. 2012-216120 (w/partial English translation).
Combined Office Action and Search Report issued Jun. 13, 2014 in Chinese Patent Application No. 201080066990.9 (w/English translation of relevant portion and English translation of category of cited documents).

* cited by examiner

Fig. 6

| ACCOUNT NUMBER 1 (910) | (920) | (93) | (94) | (95) 90 |
|---|---|---|---|---|
| IN-VEHICLE APPARATUS ID 1 | AUTHENTICATION CODE | ELECTRIC STORAGE AMOUNT | VEHICLE BEHAVIOR DATA | |
| IN-VEHICLE APPARATUS ID 2 | AUTHENTICATION CODE | ELECTRIC STORAGE AMOUNT | VEHICLE BEHAVIOR DATA | |
| IN-VEHICLE APPARATUS ID 3 | AUTHENTICATION CODE | ELECTRIC STORAGE AMOUNT | VEHICLE BEHAVIOR DATA | |
| ... | ... | ... | ... | |
| ACCOUNT NUMBER 2 | | | | |
| IN-VEHICLE APPARATUS ID 4 | AUTHENTICATION CODE | ELECTRIC STORAGE AMOUNT | VEHICLE BEHAVIOR DATA | |
| IN-VEHICLE APPARATUS ID 5 | AUTHENTICATION CODE | ELECTRIC STORAGE AMOUNT | VEHICLE BEHAVIOR DATA | |
| ... | ... | ... | ... | |
| ... | | | | |

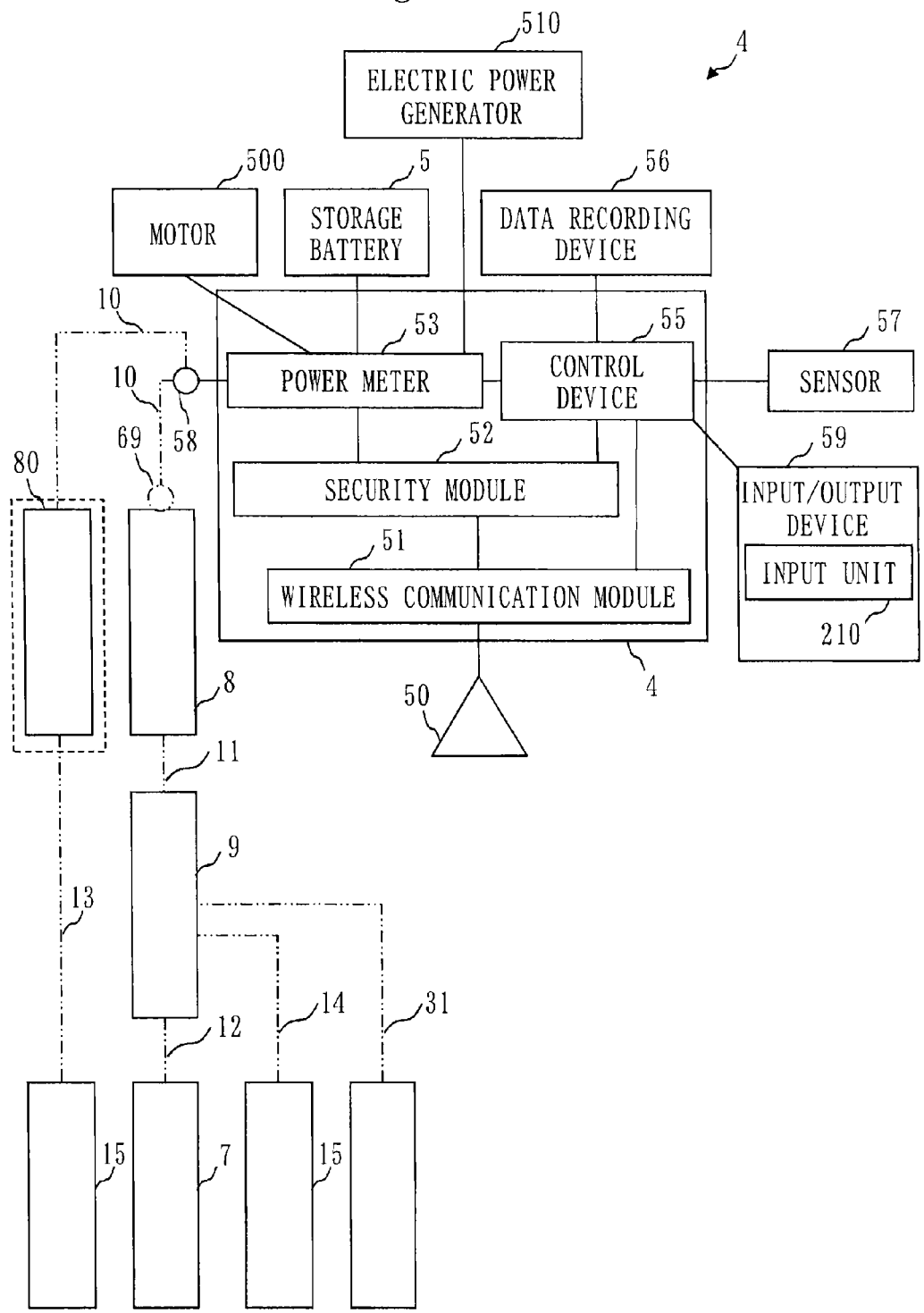

Fig. 10

| ACCOUNT NUMBER | | | | | |
|---|---|---|---|---|---|
| IN-VEHICLE APPARATUS ID 1 | AUTHENTICATION CODE | ELECTRIC STORAGE AMOUNT | ELECTRIC POWER GENERATION AMOUNT | VEHICLE BEHAVIOR DATA |
| IN-VEHICLE APPARATUS ID 2 | AUTHENTICATION CODE | ELECTRIC STORAGE AMOUNT | ELECTRIC POWER GENERATION AMOUNT | VEHICLE BEHAVIOR DATA |
| IN-VEHICLE APPARATUS ID 3 | AUTHENTICATION CODE | ELECTRIC STORAGE AMOUNT | ELECTRIC POWER GENERATION AMOUNT | VEHICLE BEHAVIOR DATA |
| ... | ... | ... | ... | ... |

ELECTRIC POWER INFORMATION MANAGEMENT APPARATUS, ELECTRIC POWER INFORMATION MANAGEMENT SYSTEM, AND ELECTRIC POWER INFORMATION MANAGEMENT METHOD

This application is a divisional application of U.S. application Ser. No. 13/695,866, filed Nov. 2, 2012, which is the national stage of PCT/JP10/072944 filed Dec. 21, 2010, and which claims priority to JP 2010-119250 filed May 25, 2010. The entire content of U.S. application Ser. No. 13/695,866 is incorporated herein by reference.

TECHNICAL FIELD

The present invention relates to an electric power information management apparatus that performs storage management of information associated with delivery and receipt of electrical energy.

BACKGROUND ART

An electric storage device of an electric powered vehicle is configured to be chargeable by a charging facility. Conventionally, there is known an ecological-point management system in which an ecological point is given to a point recipient based on an amount of greenhouse gas emission that can be reduced by traveling of an electric powered vehicle using electric power (refer to Patent Document 1, for example).

RELATED ART LITERATURE

Patent Literature

Patent Literature 1: JP 2009-134450 A

OVERVIEW OF INVENTION

Problem to be Solved by Invention

However, even if the owner of the vehicle has sold electric power to an electric power company by electric power supply from the storage battery of the vehicle to a charging facility of the electric power company, an electric power charge for charging will be paid to the electric power company when the storage battery of the vehicle is charged again at a destination of the vehicle.

Assume, for example, that the user of the electric powered vehicle has supplied electric power stored at home to the electric power company, and then he recharges the vehicle at a charging stand at the destination of the vehicle. Then, the user must purchase electric power with an amount of money higher than that for the electric power sold to the electric power company.

For this reason, when electric power selling and charging is repeated between the storage battery of the vehicle and the charging facility, there is a problem that the user of the vehicle cannot fully enjoy the merit brought about by the electric power selling. Further, there is also a problem that, when the electric power selling and charging is repeated, it takes time and effort to pay an electric power charge.

The present invention has been made in order to solve the problems described above. It is an object of the invention to obtain an electric power information management apparatus that reduces a burden of an electric power usage cost when a user of a vehicle uses electric power once supplied to an electric power facility to perform recharging at a destination of the vehicle.

An electric power information management apparatus according to the present invention includes: an electric power management database where identification information and electric power data are associated and stored; and an electric power control device that extracts from an electric power facility necessary electric power in accordance with the electric power data, based on the electric power data associated with the identification information stored in the electric power management database.

An electric power information management apparatus according to the present invention may include: a power meter that measures electric power data on electric power to be supplied from a storage battery of a vehicle to an electric power facility;
a security module that associates and encrypts identification information corresponding to the vehicle and the electric power data measured by the power meter;
a communication device that transmits to an electric power management database the identification information corresponding to the vehicle and the electric power data that have been encrypted by the security module to store the electric power data associated with the identification information in the electric power management database; and
an electric power control device that extracts necessary electric power from the electric power facility and supplies the electric power to the storage battery of the vehicle corresponding to the identification information, based on the electric power data stored in the electric power management database, being associated with the identification information.

Advantageous Effect of Invention

According to the present invention, data on electric power to be transmitted from a storage battery to an electric power facility may be stored in the electric power management database, being associated with identification information. In addition, necessary electric power may be extracted from the electric power facility based on the data on the electric power stored in the electric power management database, and then the electric power may be supplied to the storage battery. Further, electric power once discharged to the electric power facility from the storage battery may be recharged to the storage battery through an electric power facility terminal at a different location.

BRIEF DESCRIPTION OF DRAWINGS

FIG. 6 is a table showing an example of a data configuration in an electric power management database of a management center according to the first embodiment;

FIG. 7 is a diagram showing a configuration of an in-vehicle electric power information management apparatus according to a second embodiment;

FIG. 10 is a table showing a data configuration in an electric power management database of a management center according to the second embodiment.

MODE FOR CARRYING OUT INVENTION

First Embodiment

Figure 1:
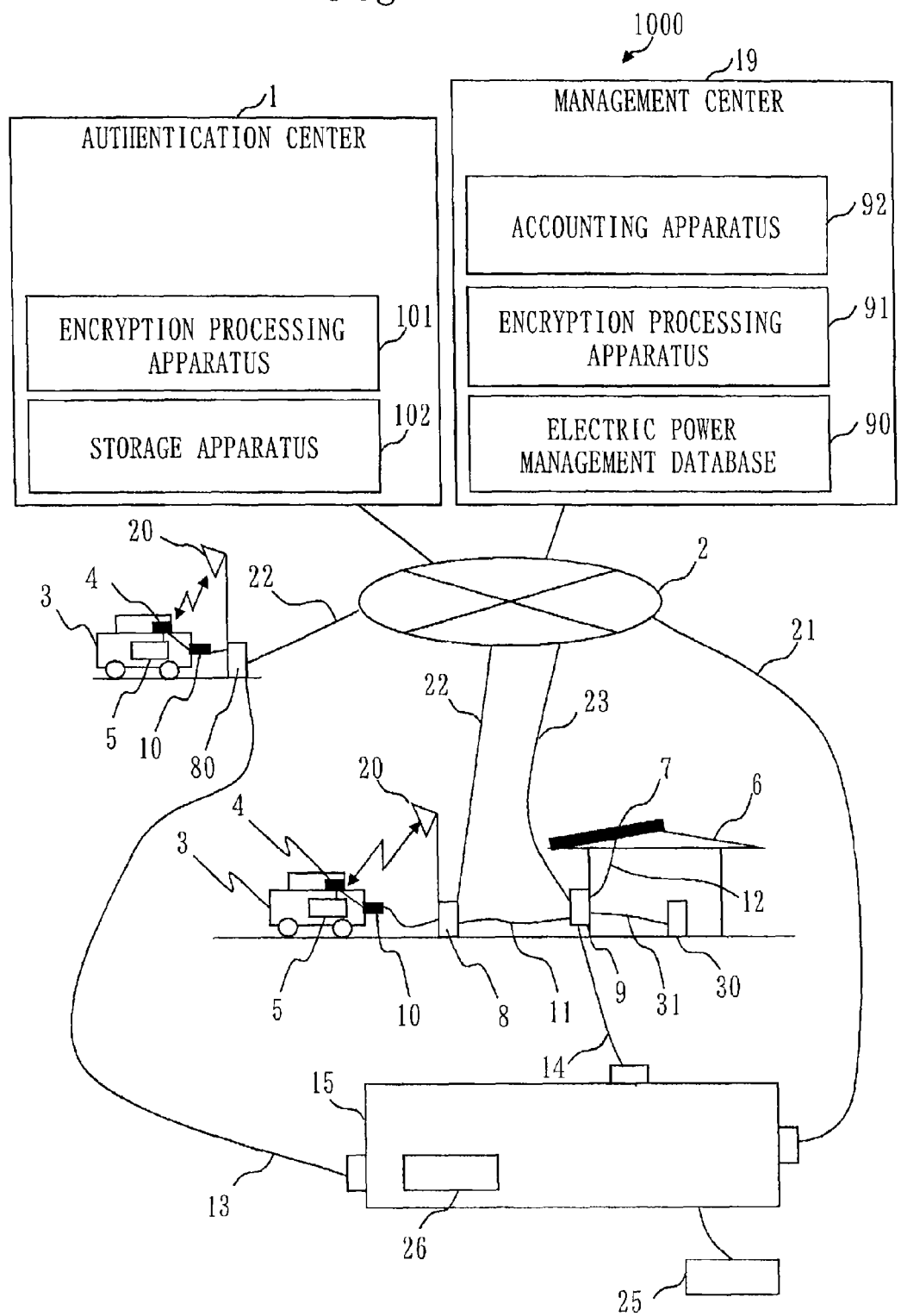
FIG. 1 is a diagram showing a configuration of an electric power information management system 1000 according to a first embodiment.

FIG. 1 is a diagram showing a configuration of an electric power information management system 1000 according to a first embodiment. Referring to FIG. 1, the electric power information management system 1000 is constituted from a plurality of in-vehicle electric power information management apparatuses 4, a plurality of electric power information management apparatuses 8 (electric power facility terminals) or a plurality of electric power information management apparatuses 80 (different electric power facility terminals).

A vehicle 3 constitutes an electric powered vehicle such as an electric car or a hybrid car, which rotates and drives wheels by electric machinery (such as a motor). The vehicle 3 includes an in-vehicle electric power information management apparatus 4 and a storage battery 5 connected to the in-vehicle electric power information management apparatus 4. The storage battery 5 of the vehicle 3 can be connected to an external electric power cable 10, thereby allowing the storage battery 5 to be charged by electric power supplied through the electric power cable 10. The storage battery 5 is constituted from a lithium ion battery, a nickel hydrogen battery, or a fuel cell. An induction coil may be provided in place of the electric power cable 10 and the storage battery 5 of the vehicle 3 may be connected to an external electric power facility by non-contact, thereby allowing transfer of electric power by non-contact.

Each of the electric power information management apparatuses 8 and 80 is connected to the vehicle 3 through the electric power cable 10. An antenna 20 is provided for each of the electric power information management apparatuses 8 and 80. The antenna 20 is connected to each of the electric power information management apparatuses 8 and 80, and performs data transfer with the in-vehicle electric power information management apparatus 4 of the vehicle 3 by wireless communication. Each of the electric power information management apparatuses 8 and 80 is connected to a communication network 2 by IP connection (Internet Protocol connection) through a communication cable 22.

A communication line may be provided in place of the antenna 20, a LAN (Local Area Network) for a vehicle of the vehicle 3 may be connected to each of the electric power information management apparatuses 8 and 80 by the communication line, and then communication between the in-vehicle electric power information management apparatus 4 and each of the electric power information management apparatuses 8 and 80 may be performed, using a CAN (Controller Area Network) or FlexRay (registered trademark).

The electric power information management apparatus 8 is connected to an electric power meter 9 through an electric power cable 11. The electric power cable 11 transmits electric power and a communication signal between the electric power information management apparatus 8 and the electric power meter 9. The electric power cable 11 is formed of an electric power line and the communication line.

The electric power meter 9 is connected to an electric power transmission and distribution facility 15 (electric power facility) through an electric power cable 14. As the electric power meter 9, a smart meter, for example, is employed. The electric power meter 9 is IP-connected to the communication network 2 through a communication cable 23.

The electric power transmission and distribution facility 15 is connected to a power generation facility 25 constituted from a nuclear power plant, a solar power plant, a hydraulic power plant, a wave energy power plant, a wind power plant, or a geothermal plant, and a substation, and a transformer. The power generation facility 25 generates electric power. The electric power transmission and distribution facility 15 is formed of electric wires, a smart grid, and an electric storage device 26, and is connected to the electric power meter 9 through the electric power cable 14. The electric power transmission and distribution facility 15 is laid in a wide area, and performs distribution, collection, transmission, or storage of electric power. The electric power transmission and distribution facility 15 is IP-connected to the communication network 2 through a communication cable 21.

An electric power generation device 7 is individually installed on a structure 6 on a personal or corporate property such as a house or a building. The electric power generation device 7 is constituted from a solar battery mounted on the roof of the structure 6 or a wind power generator. The electric power generation device 7 generates electric power. The electric power generation device 7 is connected to the electric power meter 9 through an electric power cable 12. The electric power generated by the electric power generation device 7 is measured by the electric power meter 9. A portion of the electric power is transmitted to the electric power transmission and distribution facility 15 and is then stored in the electric power transmission and distribution facility 15.

An authentication center 1 is constituted from a server. An encryption processing apparatus 101 and a storage apparatus 102 that has obtained rigid security protection are provided at the authentication center 1. The authentication center 1 is connected to the communication network 2 by IP connection (Internet Protocol connection), and transfers data with each of the electric power information management apparatuses 8 and 80, the electric power meter 9, and the electric power transmission and distribution facility 15. In the storage apparatus 102 of the authentication center 1, an identification code (in-vehicle apparatus ID) for identifying a proper in-vehicle electric power information management apparatus 4 that can communicate with each of proper electric power information management apparatuses 8 and 80 and an authentication code associated with the in-vehicle apparatus ID are stored.

This in-vehicle apparatus ID authenticates in advance that the in-vehicle electric power information management apparatus is the proper in-vehicle electric power information management apparatus 4 permitted to transfer electric power information. The procedure for this authentication is performed by submitting an application to the manager of the authentication center 1 by the owner of the in-vehicle electric power information management apparatus 4 and approving the application by the manager.

A management center 19 is constituted from a server and a computer. An electric power management database 90, an encryption processing apparatus 91, and an accounting apparatus 92 are provided for the management center 19. Though the electric power management database 90 will be described later with reference to FIG. 6, the electric power management database 90 is constituted from a memory region (account number memory region 910) that records the account number of a user associated with the in-vehicle apparatus ID of each in-vehicle electric power information management apparatus 4, a memory region (in-vehicle apparatus ID memory region 920) that records the in-vehicle apparatus ID, a memory region (authentication code memory region 93) that records an authentication code associated with the in-vehicle apparatus ID, a memory region (charge amount memory region 94) that records a charge amount associated with the in-vehicle apparatus ID, and a memory region (vehicle behavior data memory region 95) that records vehicle behavior data associated with the in-vehicle apparatus ID. The electric power management database 90 is security-protected.

The management center 19 is IP-connected to the communication network 2, and transfers data with each of the electric power information management apparatuses 8 and 80, the electric power meter 9, and the electric power transmission and distribution facility 15. The encryption processing apparatus 91 performs encryption processing on the data transferred by communication with the authentication center 1 and each of the electric power information management apparatuses 8 and 80. The management center 19 records in the electric power management database 90 usage history such as the number of accesses to the electric power management database 90 from each of the electric power information management apparatuses 8 and 80, the number of times of changes of data on an electric storage amount managed by the electric power databases 90, an amount of change in a data value, and the number of database accesses to the electric power management database 90.

The management center 19 monitors and manages information on electric power input and output at each of the electric power information management apparatuses 8 and 80, the electric power meter 9, and the electric power transmission and distribution facility 15, and manages an electric power supply amount and an electric storage amount.

The accounting apparatus 92 of the management center 19 performs accounting calculation processing of an electricity charge for charging a user and payment settlement of the electricity charge for the user, according to electric power purchased by the user through each of the electric power information management apparatuses 8 and 80 and the electric power meter 9. The accounting apparatus 92 further performs accounting calculation processing of a usage charge of the electric power management database 90 and payment settlement processing of the usage charge of the database for the user.

The management center 19 is operated by an electric power company, for example.

The owner of the in-vehicle electric power information management apparatus 4 makes an application to the management center 19 to use the electric power management database 90. The account of the user associated with the in-vehicle apparatus ID of the in-vehicle electric power information management apparatus 4 is thereby opened, the account number of the account is given, and then the memory region associated with the account number of the user is set in the electric power management database 90. The usage charge of the database in the account of the user in this case may be a certain fixed amount or free, or may be charged at a usage-based rate according to the number of accesses to the electric power management database 90, the number of changes of data on an electric storage amount, the amount of change in a data value.

When the usage charge of the electric power management database 90 in the account of the user is prescribed to be the certain fixed amount, the accounting apparatus 92 performs processing for requesting payment of the usage charge of the database of the certain fixed amount set in advance, irrespective of whether or not the accounting apparatus 92 is connected to the electric power information management apparatuses 8 or 80.

When the usage charge of the electric power management database 90 in the account of the user is prescribed to be charged according to the number of accesses to the electric power management database 90, the number of times of changes of data on the electric storage amount, and the amount of change in the data value, the accounting apparatus 92 obtains from the electric power management database 90 the usage history of the electric power management database 90, performs accounting calculation processing regularly (e.g., for each month) based on the usage history to calculate the usage charge of the database, and then performs processing for requesting payment of the usage charge.

The electric power information management apparatus 8 or the electric power information management apparatus 80 is installed on the structure 6 or in the vicinity of the structure 6. The electric power information management apparatus 8 or the electric power information management apparatus 80 is installed at each of a plurality of locations of facilities owned by individuals or corporations and public facilities, such as garages, on and in the vicinity of roads, car parks, charging stands, and shops.

The electric power information management apparatus 8 installed on or in the vicinity of the structure 6 owned by an individual or a corporation is connected to the electric power meter 9 through the electric power cable 11. The electric power information management apparatus 8 is adjusted such that when electric power transferred between the electric power meter 9 and the storage battery 5 is measured, the measured electric power does not differ from electric power measured by the electric power meter 9.

Electric power equipment 30 such as an air conditioner, a refrigerator, a TV, or a heating apparatus is installed inside the structure 6 shown in FIG. 1. The electric power equipment 30 is connected to the electric power meter 9 through an electric power cable 31.

The electric power meter 9 supplies a portion of electric power generated by the electric power generation device 7 to the electric power information management apparatus 8. The electric power information management apparatus 8 supplies to the storage battery 5 the electric power provided from the electric power meter 9 through the electric power cable 10. The storage battery 5 is thereby charged.

The storage battery 5 transmits stored electricity to the electric power meter 9 through the electric power cable 10 and the electric power information management apparatus 8.

Electric power may be thereby supplied from the electric power meter 9 to the electric power transmission and distribution facility 15.

The electric power information management apparatus 80 is connected to the electric power transmission and distribution facility 15 through an electric power cable 13. The electric power information management apparatus 80 delivers and receives electric power to and from the electric power transmission and distribution facility 15, and includes the function of the electric power meter 9 of measuring the electric power to be delivered and received.

The electric power information management apparatus 80 may receive supply of electric power stored in the storage battery 5 of the vehicle 3 through the electric power cable 10 and may supply the received electric power to the electric power transmission and distribution facility 15.

As will be described later, the electric power information management apparatus 80 allows extraction of electric power from the electric power facility (electric power transmission and distribution facility 15) and then allows supply the electric power to the storage battery 5, based on data on an electric storage amount obtained by access of the in-vehicle electric power information management apparatus 4 to the electric power management database 90 of the management center 19.

Figure 2:
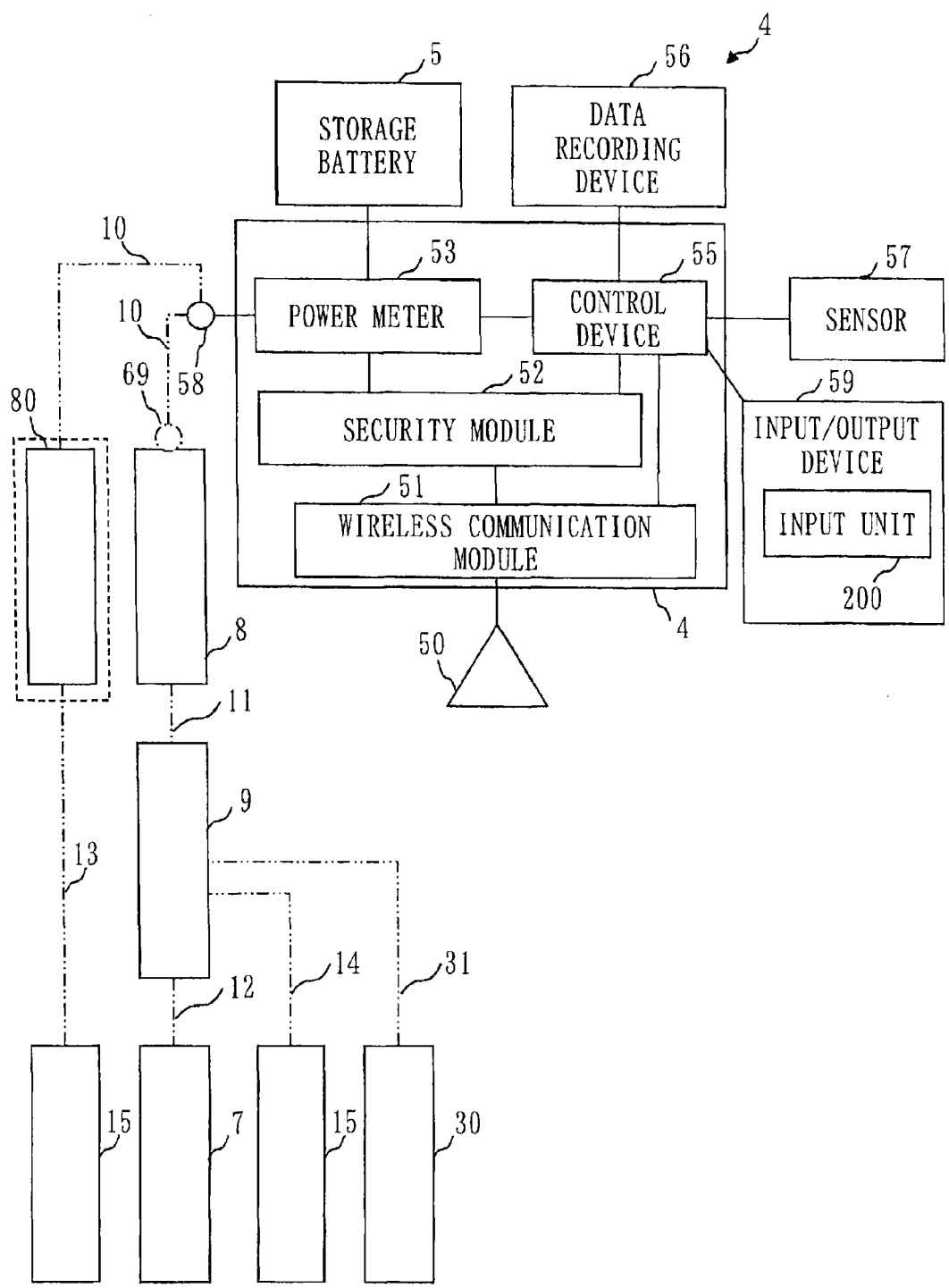
FIG. 2 is a diagram showing a configuration of an in-vehicle electric power information management apparatus according to the first embodiment.

FIG. 2 is a diagram showing a configuration of the in-vehicle electric power information management apparatus 4. Referring to FIG. 2, the in-vehicle electric power information management apparatus 4 is constituted from an antenna 50, a wireless communication module 51 (in-vehicle communication module), a security module 52 (in-vehicle security module), a power meter 53 (in-vehicle power meter), and a control device 55 (in-vehicle electric power control device). The in-vehicle electric power information management apparatus 4 is connected to devices mounted on the vehicle 3 such as an input/output device 59 including a display unit and an input unit (200), the storage battery 5, a data recording device 56, and a sensor 57.

The electric power cable 10 is connected to the power meter 53 through a power supply terminal 58. The power meter 53 is connected to the storage battery 5, the security module 52, and the control device 55. The power meter 53 may measure each of electric powers input and output through the power supply terminal 58 and an electric storage amount (electric charge) of the storage battery 5. The power meter 53 also functions as an adjustment valve for controlling an amount of inflow or outflow of electric power and controlling electric storage and discharging of electric power of the storage battery 5. The control device 55 controls an input amount or an output amount of the electric power to be adjusted by the power meter 53.

The control device 55 is connected to the data recording device 56, the sensor 57, the security module 52, and the wireless communication module 51.

The control device 55 controls operations of the power meter 53, the security module 52, and the wireless communication module 51.

The wireless communication module 51 is connected between the antenna 50 and the security module 52. The wireless communication module 51 performs dedicated short range wireless communication using a DSRC (dedicated short range communication) method or wireless communication using a wide area wireless LAN, for example.

The sensor 57 is constituted from an inertial navigation device, a satellite navigation device, a speedometer, a distance meter, an electric power meter, a brake depressing amount sensor, and an accelerator opening degree detector.

The sensor 57 measures vehicle behavior data such as a position, a speed, a wheel rotation speed, a travel distance, a power consumption amount, a brake depressing amount, and an accelerator opening degree that change according to the behavior of the vehicle 3. The data recording device 56 is a device that records various information to be controlled by the control device 55, and is a drive recorder, for example. The vehicle behavior data measured by the sensor 57 is stored in the data recording device 56.

A portion of communication data received by the wireless communication module 51 is stored in the data recording device 56.

A proper authentication code associated with the in-vehicle apparatus ID set in advance is stored in an internal storage device of the security module 52.

The input/output device 59 displays an amount of electric power input or output through the display unit and the input unit (200), communication data, guidance or input instruction content for a user, an electricity charge, and a usage charge.

Figure 3:
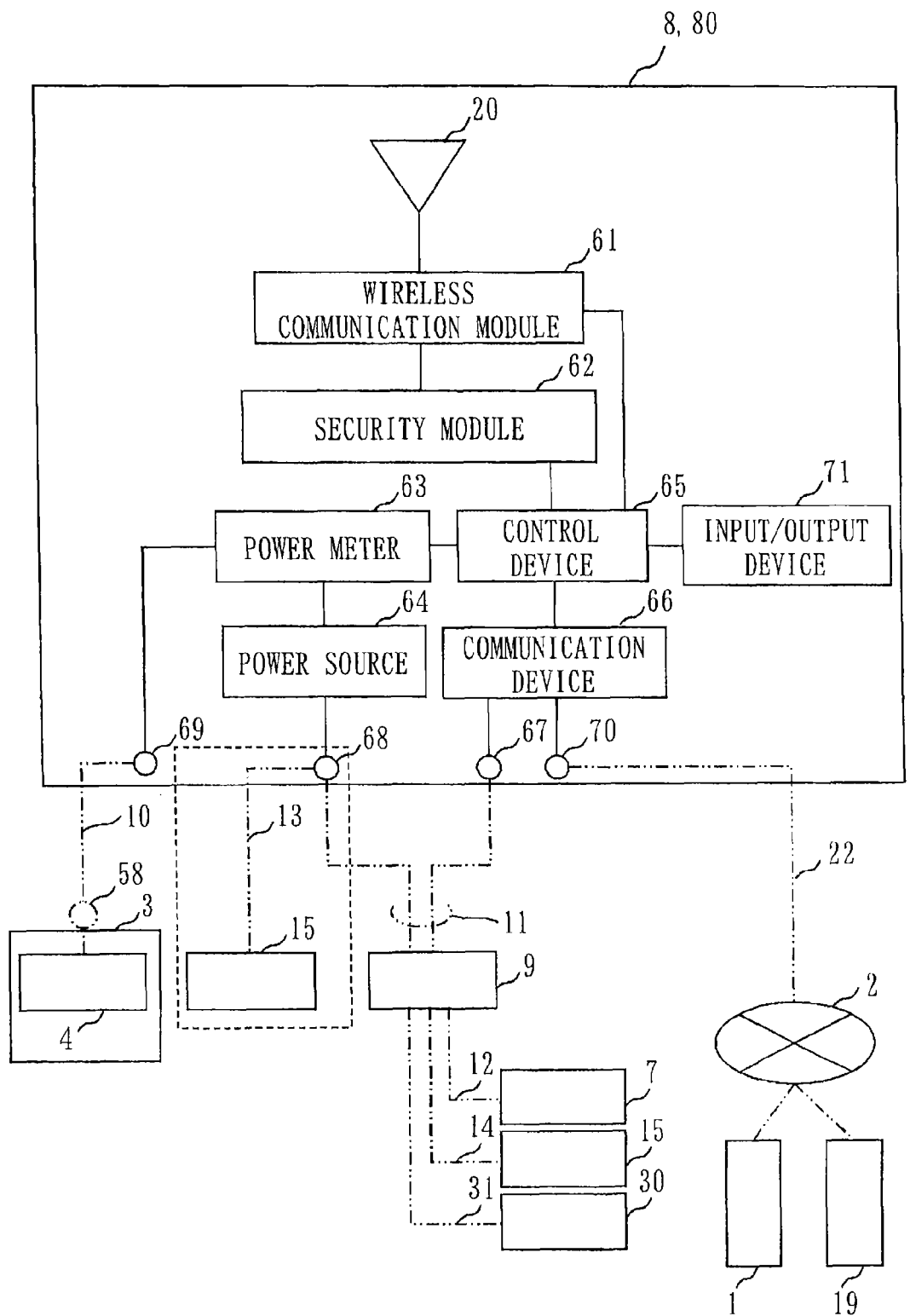
FIG. 3 is a diagram showing a configuration of an electric power information management apparatus according to the first embodiment.

FIG. 3 is a diagram showing a configuration of the electric power information management apparatus 8 (electric power facility terminal) or the electric power information management apparatus 80 (different electric power facility terminal). Referring to FIG. 3, the electric power information management apparatus 8 or 80 is constituted from an antenna 20, a wireless communication module 61 (electric power facility terminal communication module), a security module 62 (electric power facility terminal security module), a power meter 63 (electric power facility terminal power meter), a power source 64, a control device 65 (electric power facility terminal power control device), a communication device 66 (electric power facility terminal communication device), and an input/output device 71.

The power meter 63 is connected to the power source 64, the security module 62, and the control device 65. The control device 65 is connected to the communication device 66, the security module 62, the wireless communication module 61, and the input/output device 71.

The wireless communication module 61 is connected between the antenna 20 and the security module 62. The wireless communication module 61 is connected to the wireless communication module 51 of the in-vehicle electric power information management apparatus 4 through the antenna 20 and the antenna 50, for communication. The wireless communication module 61 performs the dedicated short range wireless communication using the DSRC (dedicated short range communication) method or the wireless communication using the wide area wireless LAN, for example.

The control device 65 controls operations of the power meter 63, the security module 62, and the wireless communication module 61.

The power source 64 of the electric power information management apparatus 8 is connected to the electric power line of the electric power cable 11 through a power supply terminal 68.

The power source 64 of the electric power information management apparatus 80 is connected to the electric power cable 13 and the electric power transmission and distribution facility 15 through the power supply terminal 68. Referring to FIG. 3, a range including the power supply terminal 68 indicated by a broken line shows that the power source 64 of the electric power information management apparatus 80 is connected to the electric power transmission and distribution facility 15 through the electric power cable 13.

The power meter 63 may measure each of electric powers to be input to and output from power source 64 through the power supply terminal 68 and operates as an adjusting valve for controlling an amount of inflow or outflow of electric power. The power meter 63 is connected to the electric power cable 10 through a power supply terminal 69. The power meter 63 may measure each of electric powers to be input and output through the power supply terminal 69 and operates as an adjusting valve for controlling an amount of inflow or outflow of electric power. The control device 65 controls an input amount or an output amount of the electric power to be adjusted by the power meter 63.

The communication device 66 is IP-connected to the communication network 2 through a communication terminal 70. An identification code (base station ID) of the wireless communication module 61 set in advance is stored in an internal storage device of the security module 62. The communication device 66 is connected to the communication line of the electric power cable 11 through a communication terminal 67.

This proper base station ID is also set in an internal storage device of the management center 19 in advance.

The input/output device 71 displays an amount of electric power input or output through each of the electric power information management apparatuses 8 and 80, communication data, guidance or input instruction content for a user, an electricity charge, and a usage charge.

The electric power information management system 1000 according to the first embodiment is configured as described above, and operates as follows. First, a connection operation of a communication link and a power link between the electric power information management apparatus 8 and the in-vehicle electric power information management apparatus 4 will be described.

The electric power cable 10 of the electric power information management apparatus 8 is connected to the power supply terminal 58 of the vehicle 3, as shown in FIG. 2. This allows electric power supplied from the electric power generation device 7 through the electric power meter 9, the electric power information management apparatus 8, and the power meter 53 to be charged to the storage battery 5 of the vehicle 3.

When the electric power cable 10 is connected to the power supply terminal 58 and the storage battery 5, a connection detection signal is issued from the power source 64 (in FIG. 3). It may be so configured, for example, that weak current is flown through the electric cable 10 and the electric power cable 10 is electrically connected to the storage battery 5 to detect a change in current or voltage, thereby issuing the connection detection signal.

When the control device 65 detects that the electric power cable 10 has been connected to the power supply terminal 58 of the in-vehicle electric power information management apparatus 4 by generation of the connection detection signal from the power source 64, the control device 65 activates a communication operation of the wireless communication module 61. When the communication operation is activated, the wireless communication module 61 generates a transmission modulation signal S1 for calling, and transmits the generated transmission modulation signal S1 through the antenna 20, as a transmission electric wave.

When the communication line is provided for the electric power cable 10, each of the electric power information management apparatuses 8 and 80 and an in-vehicle LAN of the vehicle 3 are connected through the communication line. In this case, the control device 65 may activate the communication operation of the wireless communication module 61 or the communication device 66 by detecting that electric power cable 10 has been connected to the power supply terminal 69 by data communication between the in-vehicle electric power information management apparatus 4 and each of the electric power information management apparatuses 8 and 80.

The in-vehicle electric power information management apparatus 4 in FIG. 2 receives the transmission electric wave from the antenna 20 of each of the electric power information management apparatuses 8 and 80, through the antenna 50. When the wireless communication module 51 detects that electric power of the signal received through the antenna 50 is equal to or larger than a predetermined threshold value, the wireless communication module 51 raises a gain of a reception-system amplifier to achieve a transition from a standby state to a communication operation state. The wireless communication module 51 demodulates the transmission modulation signal S1 from the electric power information management apparatus 8 received through the antenna 50 to perform signal reproduction. When the wireless communication module 51 recognizes that known code information is included in the demodulated transmission modulation signal S1 in advance, the wireless communication module 51 generates a transmission modulation signal S2 for response, and transmits the generated transmission modulation signal S2 through the antenna 50 as a transmission electric wave.

Next, the electric power information management apparatus 8 in FIG. 3 receives the transmission electric wave from the antenna 50 of the in-vehicle electric power information management apparatus 4 through the antenna 20. The wireless communication module 61 demodulates the transmission modulation signal S2 from the in-vehicle electric power information management apparatus 4 received through the antenna 20 to perform signal reproduction. When the wireless communication module 61 recognizes that known code information (such as a wireless code number) is included in the demodulated transmission modulation signal S2 in advance, the wireless communication module 61 starts execution of a communication connection process for establishing the communication link with the wireless communication module 51 of the in-vehicle electric power information management apparatus 4. The wireless communication module 61 transmits a communication request signal S3 for requesting transmission of the in-vehicle apparatus ID to the in-vehicle electric power information management apparatus 4 through the antenna 20.

Next, the wireless communication module 51 (in FIG. 2) of the in-vehicle electric power information management apparatus 4 receives the transmission electric wave from the antenna 20, through the antenna 50 again. When the wireless communication module 51 confirms receipt of the communication request signal S3 by demodulation of the received signal, the wireless communication module 51 causes a transmission data generation process of the security module 52 to operate. The security module 52 encrypts and encodes the in-vehicle apparatus ID of the wireless communication module 51 set in advance, using a first encryption key code stored in advance in the security module 52 as a key, and then generates transmission data of the encrypted and encoded in-vehicle apparatus ID. The wireless communication module 51 modulates the transmission data generated by the security module 52 into a transmission modulation signal S4, and then transmits the transmission modulation signal S4 through the antenna 50.

Next, the electric power information management apparatus 8 in FIG. 3 receives the transmission electric wave from the antenna 50, through the antenna 20 again. The wireless communication module 61 demodulates the transmission modulation signal S4 from the in-vehicle electric power information management apparatus 4 received through the antenna 20 to perform signal reproduction. The security module 62 decrypts the transmission modulation signal S4 demodulated by the wireless communication module 61, using a third encryption key code stored in the security module 62, as a key to code-reproduce the in-vehicle apparatus ID (e.g., decodes the in-vehicle apparatus ID into a plain text code). The third encryption key code may be a code that is the same as a second encryption key code.

When the security module 62 confirms that code reproduction of the in-vehicle apparatus ID has been normally completed and there is no error about the code of the in-vehicle apparatus ID, the security module 62 encrypts and encodes the in-vehicle apparatus ID and the base station ID set in advance, using the third encryption key code stored in advance as the key, thereby generating encrypted and encoded in-vehicle apparatus authentication data.

The control device 65 transmits the in-vehicle apparatus authentication data generated by the security module 62 to the communication device 66. The communication device 66 transmits the in-vehicle apparatus authentication data to the authentication center 1 by TCP/IP communication through the communication network 2.

The authentication center 1 in FIG. 1 decrypts the in-vehicle apparatus authentication data received from the communication device 66 of the electric power information management apparatus 8 by the encryption processing apparatus 101, using a fourth encryption key code as a key to code-reproduce the in-vehicle apparatus ID and the base station ID. The encryption processing apparatus 101 of the authentication center 1 checks whether or not the code-reproduced in-vehicle apparatus ID and base station ID are a proper in-vehicle apparatus ID and the proper base station ID that have been set in advance.

When the code-reproduced in-vehicle apparatus ID and base station ID are determined to be the proper in-vehicle apparatus ID and the proper base station ID, the encryption processing apparatus 101 transmits an encrypted authentication code to the communication device 66 of the electric power information management apparatus 8 through the communication network 2. This authentication code is a code associated with the proper in-vehicle apparatus ID, which guarantees that the code-reproduced in-vehicle apparatus ID is the proper in-vehicle apparatus ID set in advance, so that encryption of the authentication code is performed by the encryption processing apparatus 101, using a fifth encryption key code as a key. The fifth encryption key code may be the same as the fourth encryption key code.

On the other hand, when the code-reproduced in-vehicle apparatus ID is determined not to be the proper in-vehicle apparatus ID, an error signal is generated by the encryption processing apparatus 101. Then, the error signal is transmitted to the communication device 66 of the electric power information management apparatus 8 by the encryption processing apparatus 101.

Next, when the control device 65 (in FIG. 3) of the electric power information management apparatus 8 confirms that the communication device 66 has received the encrypted authentication code from the authentication center 1 by the TCP/IP communication through the communication network 2, the control device 65 transmits the received encrypted authentication code to the security module 62, and sets operation of the power meter 63 to be turned on. The control device 65 monitors an operation state of the power meter 63. When the control device 65 confirms that the operation of the power meter 63 has been set to be turned on, the control device 65 sends to the security module 62 operation-ON information indicating that the operation of the power meter 63 is turned on.

The security module 62 in FIG. 3 encrypts the encrypted authentication code, the base station ID, and the operation-ON information on the power meter 63, using the second encryption key code as a key. The security module 62 generates transmission data from this encrypted information, and then transmits the transmission data to the wireless communication module 61. The wireless communication module 61 generates a transmission modulation signal S5 from the transmission data, and then transmits the generated transmission modulation signal S5 through the antenna 20 as a transmission electric wave. Further, the security module 62 associates the received encrypted authentication code with the in-vehicle apparatus ID received from the in-vehicle electric power information management apparatus 4, and temporarily stores the received encrypted authentication code in the internal storage device. The security module 62 also enables data transmission and reception between the wireless communication module 61 and the control device 65.

On the other hand, when the communication device 66 receives the error signal from the authentication center 1 and then the code-reproduced in-vehicle apparatus ID is determined not to be the proper in-vehicle apparatus ID, the control device 65 interrupts the communication connection process by the wireless communication module 61.

Next, the wireless communication module 51 (in FIG. 2) of the in-vehicle electric power information management apparatus 4 receives the transmission electric wave from the antenna 20 through the antenna 50 again, and demodulates the received signal to perform signal reproduction. The security module 52 decrypts the transmission modulation signal S5 demodulated by the wireless communication module 51, using the first encryption key code stored in the security module 52 as the key to code-reproduce the encrypted authentication code, the base station ID, and the operation-ON information. The security module 52 decrypts the encrypted authentication code using a sixth encryption key code stored in the security module 52 as a key to code-reproduce the authentication code. This authentication code may be code-reproduced simultaneously when decryption is performed using the first encryption key code as the key. The sixth encryption key code may be the same as the first encryption key code.

The security module 52 compares the code-reproduced authentication code with the proper authentication code set in advance to check whether or not the code-reproduced authentication code is the proper authentication code.

When the control device 55 in FIG. 2 confirms that the code-reproduced authentication code is the proper authentication code by the security module 52 and then when the control device 55 confirms that the operation of the power meter 63 of the electric power information management apparatus 8 is turned on from the operation-ON information, the control device 55 sets operation of the power meter 53 to be turned on. When the security module 52 confirms that the code-reproduced authentication code is the proper authentication code, the security module 52 enables data transmission and reception between the wireless communication module 51 and the control device 55.

This establishes the communication link between the electric power information management apparatus 8 and the in-vehicle electric power information management apparatus 4, and also establishes the power link in which the power source 64 of the electric power information management apparatus 8 and the in-vehicle electric power information management apparatus 4 are electrically connected to allow transfer of electric power between both of the electric power information management apparatus 8 and the in-vehicle electric power information management apparatus 4. Delivery and receipt of electric power and communication data is performed between the power information management apparatus 8 and the in-vehicle electric power information management apparatus 4, in a process that will be described below.

When the communication link and the power link are established between the electric power information management apparatus 8 and the in-vehicle electric power information management apparatus 4, the control device 55 (in FIG. 2) of the in-vehicle electric power information management apparatus 4 performs display indicating that the communication link and the power link have been established, through the input/output device 59.

Likewise, when the communication link and the power link are established between the electric power information management apparatus 8 and the in-vehicle electric power information management apparatus 4, the control device 65 (in FIG. 3) of the electric power information management apparatus 8 performs display indicating that the communication link and the power link have been established, through the input/output device 71.

With respect to connection of the communication link and the power link between the electric power information management apparatus 80 and the in-vehicle electric power information management apparatus 4 as well, similar operations to those in the case of the electric power information management apparatus 8 are performed.

Next, a description will be given about operations of transfer and storage management of electric power between the in-vehicle electric power information management apparatus 4 and the electric power meter 9 through the electric power information management apparatus 8 in the electric power information management system 1000 in the first embodiment.

Figure 4:
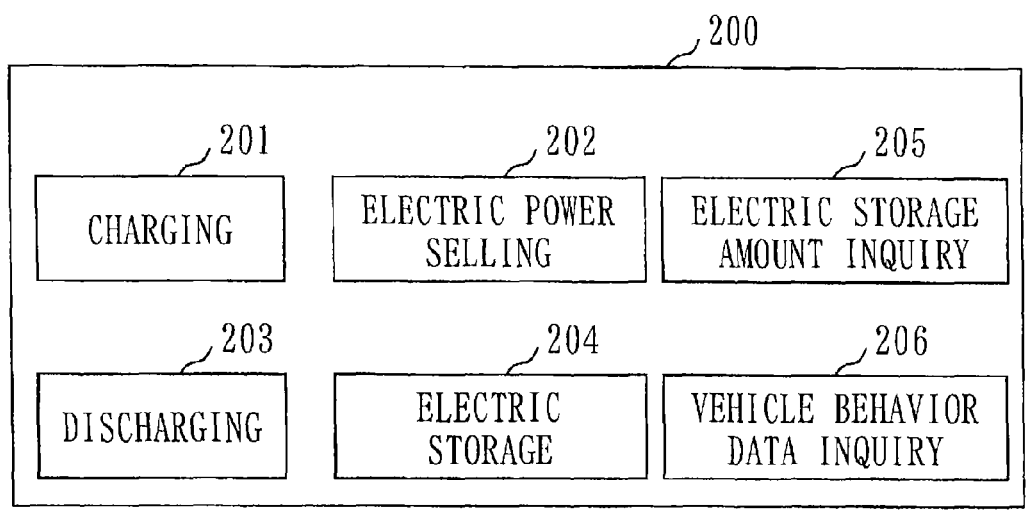
FIG. 4 is a diagram showing an input screen of an input unit of the in-vehicle electric power information management apparatus according to the first embodiment.

FIG. 4 is a diagram showing selection buttons of the input unit 200 (selection unit) of the input/output device 59 of the in-vehicle electric power information management apparatus 4 in the first embodiment.

Figure 5:
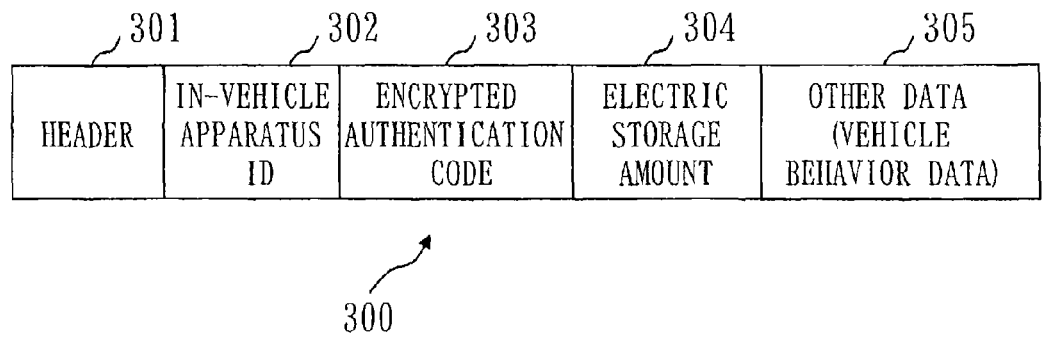
FIG. 5 is a table showing a structure of electric storage data to be transmitted from the electric power information management apparatus according to the first embodiment.

FIG. 5 is a diagram showing a structure of data to be transmitted from the in-vehicle electric power information management apparatus 4.

FIG. 6 is a diagram showing a structure of data in the electric power management database 90.

When the user (driver or passenger) on board the vehicle 3 in FIG. 1 visually recognizes the display indicating establishment of the communication link and the power link with the electric power information management apparatus 8 through the input/output device 59 (in FIG. 2) of the in-vehicle electric power information management apparatus 4, the user performs input for execution of delivery and receipt of electric power between the in-vehicle electric power information management apparatus 4 and the electric power meter 9 through the input/output device 59.

Selection display prompting selection among four process modes of a charge process mode, an electric power selling process mode, a discharge process mode, and an electric storage process mode is performed on a display unit (not shown) of the input/output device 59, for example. Selection buttons for modes including charging 201, electric power selling 202, discharging 203, and electric storage 204 are provided for the input unit 200 of the input/output device 59, as shown in FIG. 4. The selection buttons of the input unit 200 may also be provided within a display screen of the display unit.

The user selects and inputs one of the process modes of the charging 201, the electric power selling 202, the discharging 203, and the electric storage 204 through the selection button on the input unit 200 of the input/output device 59.

The control device 55 (in FIG. 2) of the in-vehicle electric power information management apparatus 4 controls the operation of the power meter 53 according to the selected and input process mode, and transmits information on the selected and input process mode to the control device 65(in FIG. 3) of the electric power information management apparatus 8 through the wireless communication modules 51 and 61. The control device 65 of the electric power information management apparatus 8 controls the operation of the power meter 63, based on the received information on the process mode.

The information on the process mode received by the electric power information management apparatus 8 is transmitted to the electric power meter 9 through the communication device 66, the communication terminal 67, and the communication line of the electric power cable 11. The electric power meter 9 performs an operation process corresponding to one of the charge process mode, the electric power selling process mode, the discharge process mode, and the electric storage process mode, based on the received information on the process mode.

The selection buttons on the input unit 200 of the input/output device 59 of the in-vehicle electric power information management apparatus 4 shown in FIG. 4 may be provided for the input/output device 71 (in FIG. 3) of the electric power information management apparatus 8. In this case, the input/output device 71 may perform operation processes similar to the selection display prompting selection of the process mode by the input/output device 59 and the selection and input process of the process mode through the selection button on the input unit 200 of the input/output device 59.

In this manner, delivery and receipt of electric power is performed between the storage battery 5 of the vehicle 3 and the power source 64 of the electric power information management apparatus 8, according to the process mode selected and then input. An example of an operation for each process mode will be described below.

(1) Charge Process Mode

When the charge process mode is selected using the input/output device 59 (in FIG. 2) of the vehicle 3, for example, the user of the in-vehicle electric power information management apparatus 4 sets and inputs a charge amount for charging the storage battery 5 through the input unit 200 of the input/output device 59 (using the button for the charging 201 in FIG. 4) to start the charging.

Referring to FIG. 3, electric power supply is provided from the power source 64 of the electric power information management apparatus 8 to the storage battery 5 to charge the storage battery 5 via the in-vehicle electric power information management apparatus 4, through the power meter 63 and the power supply terminal 69 of the electric power information management apparatus 8, the electric power cable 10, the power supply terminal 58 and the power meter 53 of the in-vehicle electric power information management apparatus 4.

In this case, electric power generated by the electric power generation device 7 is supplied to the power source 64 of the electric power information management apparatus 8 through the electric power meter 9, as shown in FIG. 3. When the electric power generated by the electric power generation device 7 is insufficient, electric power is supplied to the power source 64 of the electric power information management apparatus 8 from the electric power transmission and distribution facility 15 through the electric power meter 9.

The electric power meter 9 transmits to the management center 19 data on a usage amount of the electric power supplied from the electric power transmission and distribution facility 15 to the electric power information management apparatus 8 from a start to completion of the charging.

The power meter 63 (in FIG. 3) of the electric power information management apparatus 8 measures an amount of the electric power to be supplied from the power source 64 to the power supply terminal 58 of the in-vehicle electric power information management apparatus 4 through the power supply terminal 69 and the electric power cable 10. Likewise, the power meter 53 (in FIG. 2) of the in-vehicle electric power information management apparatus 4 measures an amount of the electric power to be supplied to the power supply terminal 58.

When the control device 55 in FIG. 2 confirms that an amount of electric power stored in the storage battery 5 measured by the power meter 53 has reached the set charge amount, the control device 55 completes the charging.

The charging may also be completed by confirming by the control device 65 (in FIG. 3) of the electric power information management apparatus 8 that the amount of electric power supplied to the storage battery 5 measured by the power meter 63 has reached the set charge amount.

The control device 55 and the control device 65 respectively transmit data obtained by the measurement by the power meter 53 and the power meter 63 to the wireless communication module 51 and the wireless communication module 61.

The wireless communication module 51 and the wireless communication module 61 exchange the measurement data of the power meter 53 and the power meter 63 by bi-directional communication, and respectively send the exchanged data to the control device 55 and the control device 65. With this arrangement, the control device 55 of the in-vehicle electric power information management apparatus 4 and the control device 65 of the electric power information management apparatus 8 confirm that there is not a discrepancy equal to or larger than a predetermined amount (prescribed amount of electric power loss set in advance based on power attenuation performance) between the data on measurement of the electric power respectively obtained by the power meter 63 and the power meter 53.

Referring to FIG. 3, the electric power meter 9 performs data communication with the communication device 66 of the electric power information management apparatus 8 through the communication line of the electric power cable 11 to receive the measurement data of the power meter 63. The electric power meter 9 confirms that there is not a discrepancy equal to or larger than the predetermined amount (prescribed amount of electric power loss set in advance based on the power attenuation performance) between the measurement data of the electric power by the power meter 63 and measurement data of the electric power meter 9.

When the management center 19 in FIG. 1 receives from the electric power meter 9 the data on the usage amount of the electric power supplied from the electric power transmission and distribution facility 15 to the electric power information management apparatus 8 through the communication network 2, the management center 19 causes the accounting apparatus 92 to execute accounting of an electricity charge. The accounting apparatus 92 calculates the electricity charge, based on the usage amount of the electric power received from the electric power meter 9, and performs payment settlement processing of the electricity charge for the owner of the in-vehicle electric power information management apparatus 4 mounted on the vehicle 3 for which the charging has been performed.

The accounting apparatus 92 presents the calculated electricity charge to the user through the communication network 2 and the input/output device 71 of the electric power information management apparatus 8 or the input/output device 59 of the in-vehicle electric power information management apparatus 4. The user performs settlement processing by specifying a settlement method for the presented electricity charge, such as settlement by card or settlement by cash, through the input/output device 59 or the input/output device 71. In the case of the settlement by card, the accounting apparatus 92 accesses the settlement service system of a card company, thereby performing processing for the settlement by card. In the case of the settlement by cash, the settlement by cash is performed by receiving cash paid from the user through a cash settlement processing device not shown, or the like.

When there is the discrepancy equal to or larger than the predetermined amount (prescribed amount of electric power loss set in advance based on the power attenuation performance) between the measurement data of the power meter 63 and the measurement data of the power meter 53 or between the measurement data of the electric power meter 9 and the measurement data of the power meter 63, the control device 55 and the control device 65 immediately stop electric power exchange between the electric power information management apparatus 8 and the in-vehicle electric power information management apparatus 4, and then the control device 55 and the control device 65 transmit an error alarm to the management center 19.

(2) Electric Power Selling Process Mode

When the electric power selling process mode is selected, the user of the in-vehicle electric power information management apparatus 4 sets and inputs an electric power selling amount for selling electric power (electric power selling) of the storage battery 5 through the input unit 200 of the input/output device 59 (using the button for the electric power selling 202 in FIG. 4), thereby starting the electric power selling.

Electric power is supplied from the storage battery 5 in FIG. 2 to the power source 64 of the electric power information management apparatus 8 via the in-vehicle electric power information management apparatus 4 through the power meter 53 and the power supply terminal 58 of the in-vehicle electric power information management apparatus 4, the electric power cable 10, the power supply terminal 69, and the power meter 63. The electric power supplied to the power source 64 (in FIG. 3) is supplied to the electric power meter 9 from the power supply terminal 68 through the electric power cable 11.

When the control device 55 (FIG. 2) of the in-vehicle electric power information management apparatus 4 confirms that a sold amount of the electric power of the storage battery 5 has reached the set electric power selling amount through measurement by the power meter 53, the control device 55 completes the selling.

The electric power meter 9 in FIG. 1 sells the electric power supplied through the electric power cable 11 to the electric power transmission and distribution facility 15.

The electric power selling may also be completed by confirming by the control device 65 (in FIG. 3) of the electric power information management apparatus 8 that the amount of the electric power sold from the storage battery 5 has reached the set electric power selling amount through measurement by the power meter 63.

The electric power meter 9 transmits to the management center 19 data on the amount of the electric power supplied from the electric power information management apparatus 8 and then sold to the electric power transmission and distribution facility 15.

The power meter 53 (in FIG. 2) of the in-vehicle electric power information management apparatus 4 measures an amount of the electric power to be supplied to the electric power cable 10 through the power supply terminal 58. Likewise, the power meter 63 of the electric power information management apparatus 8 measures an amount of the electric power to be supplied from the power supply terminal 58 of the in-vehicle electric power information management apparatus 4 through the electric power cable 10 and the power supply terminal 69.

The management center 19 in FIG. 1 calculates a purchase amount of electricity, based on the amount of the electric power sold from the electric power meter 9, using the accounting apparatus 92, and performs settlement processing for payment of the purchase amount of electricity to the owner of the in-vehicle electric power information management apparatus 4 that has performed the electric power selling. This settlement is performed by transferring the purchase amount to the bank account or by charging to electronic money owned by the user in advance with money corresponding to the purchase amount.

When electric power exchange is performed between the electric power information management apparatus 8 and the in-vehicle electric power information management apparatus 4, as in the case of the charge process mode, the control device 55 and the control device 65 perform monitoring such that there is not a mutual discrepancy equal to or larger than the predetermined amount (prescribed amount of electric power loss set in advance based on the power attenuation performance) between measurement data of the power meter 63 and measurement data of the power meter 53 or between the measurement data of the electric power meter 9 and the measurement data of the power meter 63.

(3) Discharge Process Mode

When the discharge process mode is selected, the user of the in-vehicle electric power information management apparatus 4 sets and inputs an amount of electric power to be discharged from the storage battery 5 through the input unit 200 of the input/output device 59 (using the button for the discharging 203 in FIG. 4), thereby starting the discharging.

Electric power is supplied to the power source 64 of the electric power information management apparatus 8 from the storage battery 5 of the vehicle 3 through the power meter 53 and the power supply terminal 58 of the in-vehicle electric power information management apparatus 4, the electric power cable 10, and the power supply terminal 69 and the power meter 63 of the electric power information management apparatus 8.

The electric power supplied to the power source 64 is supplied to the electric power meter 9 from the power supply terminal 68 through the electric power cable 11, as shown in FIG. 3. By providing the electric power supplied through the electric power cable 11 to the electric power equipment 30 installed indoors by the electric power meter 9, for example, the electric power is consumed by the electric power equipment 30 installed indoors. When the electric power supplied through the electric cable 11 includes surplus electric power, the surplus electric power is sold to the electric power transmission and distribution facility 15. The electric power meter 9 transmits data on an amount of the electric power supplied from the electric power information management apparatus 8 and then sold to the electric power transmission and distribution facility 15.

When the control device 55 of the in-vehicle electric power information management apparatus 4 confirms that an amount of the electric power discharged from the storage battery 5 has reached the amount of electric power set to be discharged through measurement by the power meter 53, the control device 55 completes the discharging.

The discharging may also be completed by confirming by the control device 65 of the electric power information management apparatus 8 that the amount of electric power discharged from the storage battery 5 has reached the amount of electric power set to be discharged through measurement by the power meter 63.

The management center 19 in FIG. 1 calculates a purchase amount of electricity, based on the amount of the electric power sold from the electric power meter 9, using the accounting apparatus 92, and performs settlement processing for payment of the purchase amount of electricity to the owner of the in-vehicle electric power information management apparatus 4 that has performed the electric power selling.

When electric power exchange is performed between the electric power information management apparatus 8 and the in-vehicle electric power information management apparatus 4, as in the case of the charge process mode, the control device 55 and the control device 65 perform monitoring such that there is not a mutual discrepancy equal to or larger than the predetermined amount (prescribed amount of electric power loss set in advance based on the power attenuation performance) between measurement data of the power meter 63 and measurement data of the power meter 53 or between the measurement data of the electric power meter 9 and the measurement data of the power meter 63.

(4) Electric Storage Process Mode

When the electric storage process mode is selected, the user of the in-vehicle electric power information management apparatus 4 sets and inputs an electric storage amount for output obtained by supplying electric power of the storage battery 5 to the electric power transmission and distribution facility 15 for electric storage (using the button for electric storage 204 in FIG. 4) through the input unit 200 of the input/output device 59, thereby starting the electric storage. The electric power transmission and distribution facility 15 in FIG. 1 may store the electric power supplied from the storage battery 5 (in FIG. 2) in the electric storage device 26, or may transmit and distribute the electric power to different electric power equipment on an electric power network through a power grid.

The electric power is supplied to the power source 64 of the electric power information management apparatus 8 from the storage battery 5 of the vehicle 3 through the power meter 53 and the power supply terminal 58 of the in-vehicle electric power information management apparatus 4, the electric power cable 10, the power supply terminal 69, and the power meter 63, as shown in FIG. 2. The electric power supplied to the power source 64 is supplied to the electric power meter 9 through the electric power cable 11 from the power supply terminal 68.

The electric power meter 9 sends the electric power supplied from the electric power information management apparatus 8 to the electric power transmission and distribution facility 15. The electric power transmission and distribution facility 15 in FIG. 1 stores the electric power supplied from the electric power information management apparatus 8 through the electric power meter 9 in the electric storage device 26, and also measures an electric storage amount of the electric storage device 26.

When the control device 55 (in FIG. 2) of the in-vehicle electric power information management apparatus 4 confirms that an amount of the electric power discharged from the storage battery 5 and then stored in the electric storage device 26 (in FIG. 1) has reached the set electric storage amount for output, through measurement by the power meter 53, the control device 55 completes the electric storage.

The electric storage may also be completed by confirming by the control device 65 (in FIG. 3) of the electric power information management apparatus 8 that the amount of the electric power discharged from the storage battery 5 and then stored in the electric storage device 26 has reached the set electric storage amount for output, through measurement by the power meter 63.

The control device 65 (in FIG. 3) of the electric power information management apparatus 8 generates encrypted electric storage data from measurement data on the electric power (electric storage amount) supplied from the in-vehicle electric power information management apparatus 4 and then measured by the power meter 63, using the security module 62. In this case, the security module 62 performs packetization by associating the electric storage amount measured by the power meter 63, the base station ID, the encrypted authentication code, and the in-vehicle apparatus ID of the in-vehicle electric power information management apparatus 4 connected by the power link, thereby generating packetized electric storage data. Then, the security module 62 encrypts the generated electric storage data using a seventh encryption key code as a key, thereby generating encrypted electric storage data. The seventh encryption key code may be the same as the third encryption key code.

FIG. 5 shows an example of a data structure of this packetized electric storage data. Referring to FIG. 5, an electric storage data packet 300 is constituted from a header 301, an in-vehicle apparatus ID 302, an encrypted authentication code 303, an electric storage amount 304, and other data 305. By generating the encrypted packetized electric storage data by the security module 62 as described above, security protection of the data on the electric storage amount may be ensured.

The electric storage data may also be generated by the security module 52 of the in-vehicle electric power information management apparatus 4. In this case, the security module 52 performs packetization by associating the electric storage amount measured by the power meter 53, the base station ID obtained from the electric power information management apparatus 8, the authentication code obtained from the authentication center 1, and the in-vehicle apparatus ID. Then, the security module 52 performs encryption using the first encryption key code as the key. In this case, the authentication code is encrypted and security-protected. Thus, the authentication data encrypted in advance does not need to be employed for the electric storage data.

The generated encrypted electric storage data is transmitted from the communication device 66 (in FIG. 3) to the management center 19 through the communication cable 22.

The management center 19 in FIG. 1 decodes the encrypted electric storage data received from the electric power information management apparatus 8 by the encryption processing apparatus 91, using an eighth encryption key code as a key to reproduce the electric storage data. Then, the management center 19 temporarily stores the reproduced electric storage data in the storage apparatus. When the management center 19 confirms that the base station ID included in the reproduced electric storage data is proper by referring to the base station ID stored in the internal storage device, the management center 19 encrypts the encrypted authentication code included in the reproduced electric storage data by the encryption processing apparatus 91, using a ninth encryption key code as a key, and then transmits the resulting code to the authentication center 1 through the communication network 2. The ninth encryption key code may be the same as the eighth encryption key code.

The authentication center 1 decodes the encrypted authentication code transmitted from the management center 19 by the encryption processing apparatus 101, using a tenth encryption key code as a key to reproduce the authentication code. The encryption processing apparatus 101 of the authentication center 1 compares the reproduced authentication code with the authentication code set in advance to check whether or not the reproduced authentication code is proper. When the encryption processing apparatus 101 confirms that the reproduced authentication code is proper, the authentication center 1 transmits a data guarantee code encrypted by the encryption processing apparatus 101 using the tenth encryption key code as the key to the management center 19. The tenth encryption key code may be the same as the fourth encryption key code.

The management center 19 in FIG. 1 decodes the encrypted data guarantee code received from the authentication center 1 by the encryption processing apparatus 91, using the ninth encryption key code as the key, to obtain the decoded data guarantee code. When the management center 19 obtains the decoded data guarantee code, the management center 19 records the electric storage data received from the electric power information management apparatus 8 in the memory region of electric storage amounts in the electric power management database 90. As shown in FIG. 6, in-vehicle apparatus IDs, encrypted authentication codes, and electric storage amounts (example of unit of electric power amount: kwh) are stored in the respective memory regions (which are the in-vehicle apparatus ID memory region 920, the authentication code memory region 93 of encrypted authentication codes, and the electric storage amount memory region 94) for each account number of an owner (user) of the in-vehicle electric power information management apparatus 4.

When electric power exchange is performed between the electric power information management apparatus 8 and the in-vehicle electric power information management apparatus 4 as in the case of the charge process mode, the control device 55 and the control device 65 perform monitoring such that there is not a mutual discrepancy equal to or larger than the predetermined amount (prescribed amount of electric power loss set in advance based on the power attenuation performance) between the measurement data of the power meter 63 and measurement data of the power meter 53 or between measurement data of the electric power meter 9 and the measurement data of the power meter 63.

Vehicle behavior data stored in the data recording device 56 (in FIG. 2) of the in-vehicle electric power information management apparatus 4 may be transmitted to the management center 19 through the electric power information management apparatus 8, in the electric storage process mode.

In this case, the electric power information management apparatus 8 incorporates the vehicle behavior data such as a position, a speed, a wheel rotation speed, a distance, and a power consumption amount that change according to a behavior of the vehicle 3 into the other data of the packetized electric storage data, thereby generating encrypted electric storage data. The generated electric storage data is transmitted to the management center 19. The management center 19 decodes the encrypted electric storage data transmitted from the electric power information management apparatus 8 using the eighth encryption key code to reproduce the electric storage data including the vehicle behavior data. The management center 19 associates the reproduced electric storage data including the vehicle behavior data with the account number and the in-vehicle apparatus ID of the owner (user) of the in-vehicle electric power information management apparatus 4 to record the vehicle behavior data in the memory region of the vehicle behavior data (95) in the electric power management database 90.

In addition to the selection buttons for selecting each of the process modes of the charging 201, the electric power selling 202, the discharging 203, and the electric storage 204, selection buttons for selecting each of process modes of electric storage amount inquiry 205 and vehicle behavior data inquiry 206 may also be provided for the input unit 200 of the input/output device 59.

When the mode of the electric storage amount inquiry is selected, the control device 55 of the in-vehicle electric power information management apparatus 4 refers to the electric power management database 90 of the management center 19 for data on an electric storage amount associated with the in-vehicle apparatus ID, through the electric power information management apparatus 8. When the management center 19 receives the inquiry of the data associated with the in-vehicle apparatus ID according to the electric power amount inquiry mode from the in-vehicle electric power information management apparatus 4, the management center 19 transmits content of the data on the electric storage amount associated with the in-vehicle apparatus ID to the in-vehicle electric power information management apparatus 4, through the electric power information management apparatus 8.

Likewise, when the vehicle behavior data inquiry is selected, the control device 55 of the in-vehicle electric power information management apparatus 4 refers to the electric power management database 90 of the management center 19 for vehicle behavior data associated with the in-vehicle apparatus ID through the electric power information management apparatus 8. When the management center 19 receives the inquiry of the data associated with the in-vehicle apparatus ID according to the vehicle behavior data inquiry mode from the in-vehicle electric power information management apparatus 4, the management center 19 transmits data content of the vehicle behavior data associated with the in-vehicle apparatus ID to the in-vehicle electric power information management apparatus 4, through the electric power information management apparatus 8.

Needless to say, when this inquiry of the data is made, cryptographic communication and mutual authentication are performed, where appropriate.

Next, operations of transfer and storage management of electric power between the in-vehicle electric power information management apparatus 4 and the electric power information management apparatus 80 in the electric power information management system 1000 in the first embodiment will be described. It is assumed herein that the electric power information management apparatus 80 can be moved by the vehicle 3, and the electric power information management apparatus 80 is placed at a different location from the electric power information management apparatus 8.

When the user on board the vehicle 3 visually recognizes display indicating establishment of the communication link and the power link between the electric power information management apparatus 80 and the in-vehicle electric power information management apparatus 4 through the input/output device 59 (in FIG. 2) of the in-vehicle electric power information management apparatus 4, the user performs input for execution of delivery and receipt of electric power between the in-vehicle electric power information management apparatus 4 and the electric power information management apparatus 80 through the input/output device 59.

To take an example, selection display prompting selection among the four process modes of the charge process mode, the electric power selling process mode, the discharge process mode, and the electric storage process mode is performed on the display unit (not shown) of the input/output device 59.

The user selects and inputs one of the process modes of the charging 201, the electric power selling 202, the discharging 203, and the electric storage 204 through the input unit 200 of the input/output device 59, as shown in FIG. 4.

The control device 55 (in FIG. 2) of the in-vehicle electric power information management apparatus 4 controls operation of the power meter 53 according to the selected and input process mode, and also transmits information on the selected and input process mode to the control device 65 of the electric power information management apparatus 80 through the wireless communication modules 51 and 61. The control device 65 of the electric power information management apparatus 80 controls operation of the power meter 63 based on the received information on the process mode, thereby performing an operation process associated with one of the process modes of the charging, the electric power selling, the discharging, and the electric storage.

The selection buttons on the input unit 200 of the input/output device 59 of the in-vehicle electric power information management apparatus 4 shown in FIG. 4 may be provided for the input/output device 71 of the electric power information management apparatus 80. In this case, the input/output device 71 may perform process operations similar to those for the process of selection display prompting selection of each process mode by the input/output device 59 and the process of selection and input of the each process mode through the selection button of the input unit 200 of the input/output device 59.

As described above, delivery and receipt of electric power is performed between the storage battery 5 of the vehicle 3 and the power source 64 of the electric power information management apparatus 80, according to the selected and input process mode. The electric power information management apparatus 80 is connected to the electric power transmission and distribution facility 15 by the electric power cable 13, as shown in FIG. 3. Delivery and receipt of the electric power according to the selected and input process mode is therefore performed between the electric power information management apparatus 80 and the electric power transmission and distribution facility 15.

Since the electric power information management apparatus 80 includes the function of the electric power meter 9 as well, each of the electric power selling process mode, the discharge process mode, and the electric storage process mode is similarly performed as in the case of the above-mentioned transfer and storage management of electric power between the in-vehicle electric power information management apparatus 4 and the electric power information management apparatus 8. Thus, description of these process modes will be omitted.

In the following description, the charge process mode using the electric power information management apparatus 80 will be explained.

<Charge Process Mode of the Electric Power Information Management Apparatus 80>

When the charge process mode is selected using the input unit 200 of the input/output 59 of the vehicle 3, the user of the in-vehicle electric power information management apparatus 4 sets and inputs a charge amount (set charge amount) for charging the storage battery 5 through the input unit 200 of the input/output device 59, thereby starting charging.

Referring to FIG. 3, electric power is supplied from the power source 64 of the electric power information management apparatus 80 to the storage battery 5 of the vehicle 3 to charge the storage battery 5, through the power meter 63 and the power supply terminal 69 of the electric power information management apparatus 80, the electric power cable 10, the power supply terminal 58 and the power meter 53 of the in-vehicle electric power information management apparatus 4.

In this case, the electric power is supplied to the power source 64 of the electric power information management apparatus 80 from the electric power transmission and distribution facility 15 through the electric power cable 13 and the power supply terminal 68.

The power meter 63 of the electric power information management apparatus 80 measures an amount of the electric power to be supplied from the power source 64 to the power supply terminal 58 of the in-vehicle electric power information management apparatus 4 through the power supply terminal 69 and the electric power cable 10. That is, the power meter 63 of the electric power information management apparatus 80 measures data on the usage amount of the electric power for charging to be supplied from the electric power transmission and distribution facility 15 to the storage battery 5 of the in-vehicle electric power information management apparatus 4.

Likewise, the power meter 53 of the in-vehicle electric power information management apparatus 4 measures an amount of the electric power to be supplied to the power supply terminal 58.

When the control device 55 of the in-vehicle electric power information management apparatus 4 confirms that an electric storage amount of the storage battery 5 measured by the power meter 53 has reached the set charge amount, the control device 55 completes the charging.

The electric storage may also be completed by confirming by the control device 65 of the electric power information management apparatus 8 (in FIG. 3) that the electric storage amount supplied to the storage battery 5 and measured by the power meter 63 has reached the set charge amount.

The control device 55 and the control device 65 respectively transmit data obtained by the measurement by the power meter 53 and the data obtained by the measurement by the power meter 63 to the wireless communication module 51 and the wireless communication module 61.

The wireless communication module 51 and the wireless communication module 61 exchange the measurement data of the power meter 63 and the power meter 53, the in-vehicle apparatus ID, the encrypted authentication codes, and the base station ID by bi-directional communication and then respectively transmit the exchanged data to the control device 55 and the control device 65. With this arrangement, the control device 55 of the in-vehicle electric power information management apparatus 4 and the control device 65 of the electric power information management apparatus 8 confirm that there is not a discrepancy equal to or larger than the predetermined amount (prescribed amount of electric power loss set in advance based on the power attenuation performance) between the measurement data on the electric power respectively obtained by the power meter 63 and the power meter 53.

When there is the discrepancy equal to or larger than the predetermined amount (prescribed amount of electric power loss set in advance based on the power attenuation performance) between the measurement data of the power meter 63 and the measurement data of the power meter 53, the control device 55 and the control device 65 immediately stop electric power exchange between the electric power information management apparatus 80 and the in-vehicle electric power information management apparatus 4, and then transmit an error alarm to the management center 19.

The security module 62 performs packetization of the data on the usage amount of the electric power measured by the power meter 63 and the power meter 53, the in-vehicle apparatus ID obtained from the in-vehicle electric power information management apparatus 4 and the encrypted authentication code, and the base station ID set in advance. Then, the security module 62 encrypts the packetized data using the seventh encryption key code, as charging data. The communication device 66 transmits this packetized encrypted charging data to the management center 19.

The management center 19 in FIG. 1 decodes the charging data transmitted from the electric power information management apparatus 80 by the encryption processing apparatus 91 using the eighth encryption key code to reproduce the data on the usage amount of the electric power, the vehicle ID, the encrypted authentication code, and the base station ID. When the management center 19 confirms that the reproduced in-vehicle apparatus ID and the reproduced base station ID are the proper ones set in advance, the management center 19 encrypts the authentication code reproduced by the encryption processing apparatus 91, using the ninth encryption key code as the key, and then transmits the encrypted reproduced authentication code to the authentication center 1 through the communication network 2.

The authentication center 1 in FIG. 1 decodes the encrypted authentication code transmitted from the management center 19 by the encryption processing apparatus 101, using the tenth encryption key code as the key to reproduce the authentication code. The authentication center 1 checks whether or not the reproduced authentication code is proper by comparison with the authentication code set in advance. When the authentication center 1 confirms that the reproduced authentication code is proper, the authentication center 1 transmits to the management center 19 a data guarantee code encrypted by the encryption processing apparatus 101 using the tenth encryption key code as the key.

The management center 19 decodes and reproduces the encrypted data guarantee code received from the authentication center 1 by the encryption processing apparatus 91, using the ninth encryption key code as the key to obtain the decoded data guarantee code. When the management center 19 obtains the decoded data guarantee code, the management center 19 refers to the electric power management database 90 using the in-vehicle apparatus ID of the in-vehicle electric power information management apparatus 4 as a key to obtain data on an electric storage amount associated with the in-vehicle apparatus ID recoded in the memory region (94) of electric storage amounts in the electric power management database 90.

The management center 19 obtains a differential electric power amount (A−B) obtained by subtracting the data on the usage amount of the electric power (used electric power amount B) received from the electric power information management apparatus 80 from the data on the electric storage amount obtained from the electric power management database 90. When the obtained differential electric power amount (A−B) becomes smaller than zero, the management center 19 calculates an electricity charge in accordance with the absolute value of the differential electric power amount, based on a rate structure set in advance. When the obtained differential electric power amount is equal to or larger than zero, the electricity charge becomes zero.

When the calculated differential electric power amount (A−B) is smaller than zero, the management center 19 regards the differential electric power amount as the electric power that has been purchased (purchased power). The payment and settlement processing of the electricity charge is therefore performed by the accounting apparatus 92.

To take an example, the accounting apparatus 92 calculates the electricity charge in accordance with the purchased electric power amount (differential electric power amount) for the owner of the in-vehicle electric power information management apparatus 4 mounted on the vehicle 3 for which the charging has been performed. The accounting apparatus 92 presents the calculated electricity charge to the user through the communication network 2 and the input/output device 59 of the electric power information management apparatus 80 or the input/output device 71 of the in-vehicle electric power information management apparatus 4.

The user specifies the settlement method of the presented electricity charge such as settlement by card or cash through the input/output device 59 or the input/output device 71, thereby performing processing for the settlement. In the case of the settlement by card, the accounting apparatus 92 accesses the settlement service system of a card company, thereby performing processing for the settlement by card. In the case of the settlement by cash, the settlement by cash is performed by receiving cash paid from the user through a cash settlement processing device not shown, or the like.

As described above, the accounting calculation processing of the electricity charge for charging the user is performed in accordance with the electric power amount purchased by the user through the electric power information management apparatus 80, and settlement of the electricity charge is performed on the spot.

When the obtained differential electric power amount is equal to or larger than zero, the electricity charge to be paid is zero. Thus, the settlement processing of the electricity charge as mentioned above becomes unnecessary. Time and effort for the settlement processing by the user and the management center 19 will be saved.

The management center 19 determines the obtained differential electric power amount (A−B) as data on a new electric storage amount. When the obtained new electric storage amount is equal to or less than zero in this case, the electric storage amount is set to zero. The management center 19 overwrites and updates the electric storage amount data recording region associated with the in-vehicle apparatus ID in the electric power management database 90 by the data on the new electric storage amount.

The management center 19 may perform point addition to an electric storage amount recorded in the electric power management database 90 according to a data amount and data content of vehicle behavior data associated with the in-vehicle apparatus ID. To take an example, based on the vehicle behavior data, a travel distance of the vehicle 3 is divided by a consumed electric power amount to calculate a travel distance per consumed electric power. Then, by comparing the travel distance per consumed electric power with a predetermined reference value, point addition may be performed to the electric storage amount, according to a degree exceeding the predetermined reference value.

The electric power information management apparatus 80 may obtain vehicle behavior data recorded in the electric power management database 90 of the management center 19, together with electric storage amount data associated with the in-vehicle apparatus ID, and may transmit the obtained data to the in-vehicle electric power information management apparatus 4 to record the data in the data recording device 56.

The electric power information management apparatus 80 may be connected to a different electric power meter 9 through an electric power cable, like the electric power information management apparatus 8. In this case, the electric power information management apparatus 80 is connected to the electric power transmission and distribution facility 15 through the different electric power meter 9.

In each of the electric power information management apparatuses 8 and 80, the wireless communication module 61 and the power meter 63 may be configured to be disconnected as discrete elements. In this case, the security module 62 may be connected to each of the wireless communication module 61 and the power meter 63 through a dedicated line. Alternatively, the security module may be provided for each of the wireless communication module 61 and the power meter 63 that have been disconnected, and both of the wireless communication module 61 and the power meter 63 may be connected by the security modules.

Further, like the electric power information management apparatus 80, the electric power information management apparatus 8 may be configured to allow extraction of electric power from the electric power facility (electric power transmission and distribution facility 15) and supply of the electric power to the storage battery 5, based on data on an electric storage amount, by accessing the electric power management database 90.

As described above, the electric power information management system 1000 according to the first embodiment is configured to include the power meters (53, 63) each of which measures electric power data on electric power to be supplied from the storage battery (5) of the vehicle (3) to the electric power facility (electric power transmission and distribution facility 15), the security modules (52, 62) each of which associates and encrypts identification information (in-vehicle apparatus ID) corresponding to the vehicle 3 and the electric power data measured by a corresponding one of the power meters, the communication device (66) which transmits the identification information corresponding to the vehicle and the electric power data that have been encrypted by the security module to the electric power management database (90) to store the electric power data associated with the identification information in the electric power management database, and the electric power control devices (55, 65) each of which extracts necessary electric power from the electric power facility (electric power transmission and distribution facility 15) through the electric power facility terminal (electric power information management apparatus 80) according to the electric power data stored in the electric power management database, being associated with the identification information, and supplies the electric power to the storage battery of the vehicle associated with the identification information. By this configuration, the data on the electric power to be transmitted from the storage battery of the vehicle to the electric power facility may be stored in the electric power management database, being associated with the identification information on the vehicle. In addition, the necessary electric power may be extracted from the electric power facility based on the electric power data stored in the electric power management database, and then the electric power may be supplied to the storage battery of the vehicle. Accordingly, the electric power once discharged to the electric power facility from the storage battery of the vehicle may be recharged to the storage battery of the vehicle through the electric power facility terminal at a different location.

With this arrangement, after electric power of the storage battery of the vehicle has been supplied to and has been stored in the electric power facility (electric power transmission and distribution facility 15), the electric power stored in advance may be extracted and may be recharged to the storage battery from a different electric power facility.

Generally, there arises a difference in transaction amounts per electric power between selling of electric power from the storage battery 5 of the vehicle 3 to the electric power facility (electric power transmission and distribution facility 15) and buying (electric power purchase) of electric power from the electric power facility (electric power transmission and distribution facility 15) to the storage battery 5 of the vehicle 3. The price for buying of the electric power becomes higher than the price for selling of the electric power. In the electric power information management system 1000 in this embodiment, however, a usage charge in each user's account in the electric power management database 90 of the management center 19 may be charged for payment according to the fixed amount to be paid by the month or the year, or at the usage-based rate according to the number of accesses. Thus, an electric power utilization service that is low price and flexible may be provided to the user.

Consequently, using electric power data on the electric power management database 90, electric power may be virtually stored in advance, the virtually stored electric power may be extracted from an electric power facility to be charged to the storage battery of a vehicle at a travel destination of the vehicle. Thus, the need for always performing settlement processing whenever charging is performed, for example, is eliminated, and a burden of the user for payment of the cost of charging and time and effort for the payment may be reduced.

Further, the in-vehicle electric power information management apparatus 4 and each of the electric power information management apparatuses 8 and 80 may transfer electric power data by wireless communication between the antenna 20 and the antenna 50 even if the communication line is not provided for the electric power cable 10. Accordingly, the configuration of the electric cable 10 is simplified. When the electric power cable 10 is formed of an induction coil and electric power is transferred between the in-vehicle electric power information management apparatus 4 and each of the electric power information management apparatuses 8 and 80 by non-contact, the communication link and the power link may be implemented by non-contact without connecting the in-vehicle electric power information management apparatus 4 and each of the electric power information management apparatuses 8 and 80 by a cable.

When an increase in efficiency of electric power utilization is achieved using a highly-developed electric power network (smart grid) as an electric power network, effective utilization of the electric power network may be achieved by transferring electric power between the electric power network and an electric powered vehicle. In this first embodiment, by combining the electric power network and the information network, transfer of a usage charge associated with transfer of electric power may be more readily performed, thus making it possible for a user to effectively utilizing the electric power network more readily.

For this reason, compared with the conventional ecological-point management system in which an ecological point is given to a point recipient based on an amount of greenhouse gas emission that can be reduced by traveling of an electric powered vehicle using electric power, a greater promotion effect may be obtained when popularizing a social environment improvement plan of reducing a carbon dioxide emission amount by the electric powered vehicle.

The electric power information management system 1000 may include the electric power management database 90 in which identification information and electric power data are associated and then stored. The electric power information management system 1000 may include the electric power control devices (55, 65) each of which extracts necessary electric power corresponding to the electric power data from the electric power facility (electric power transmission and distribution facility 15) through a corresponding one of the electric power facility terminals (electric power information management apparatuses 8 and 80) to charge the storage battery, based on the electric power data associated with the identification information and stored in the electric power management database 90.

In this case, data security protection is performed for the identification information and the electric power data stored in the electric power management database 90, referred to, and output, by encryption of the data and physical security management of a server that constitutes the electric power management database 90 (such as access target management, data security management such as prevention of hacking and prevention of data falsification, management of entering or leaving a server room). Naturally, the electric power control devices (55, 65) also perform security-protected communication through the security modules (52, 62).

In this case, it may also be so arranged that by connecting a different electric power information management apparatus other than the in-vehicle electric power information management apparatus 4 to the electric power facility terminal (electric power information management apparatus 8 or 80), electric power is extracted from the electric power facility terminal (electric power information management apparatus 8 or 80) and is then charged to the different electric power information management apparatus. The electric power information management apparatus of this different type should include the storage battery 5, the power meter 53, the security module 52, the antenna 50, the power supply terminal 58, the wireless communication module 51, the control device 55, and the input/output device 59 as shown in FIG. 2. This electric power information management apparatus of this different type may be formed by providing the storage battery for a transportable computer such as a portable terminal or a portable computer (e.g., a personal computer).

The electric power information management apparatus of the different type may be a terminal dedicated for extracting electric power from the electric power facility terminal (electric power information management apparatus 8 or 80) (which does not supply electric power to the electric power facility terminal (electric power information management apparatus 8 or 80)).

By configuring the electric power information management system 1000 as described above, electric power may be extracted from the electric power facility terminal (electric power information management apparatus 8 or 80) more readily and flexibly, irrespective of the type of the terminal, using electric power data stored in the electric power management database in advance and using the computer that is transportable by a user. Accordingly, the electric power network is more effectively utilized by the user.

Second Embodiment

FIG. 7 is a diagram showing a configuration of the in-vehicle electric power information management apparatus 4 according to a second embodiment. In contrast with FIG. 2, an electric power generator 510 and a motor 500 are listed as connection destinations of the in-vehicle electric power information management apparatus 4 in FIG. 7. An input unit of the input/output device 59 in FIG. 7 is an "input unit 210". The other configurations are the same as those in FIG. 2.

Figure 8:
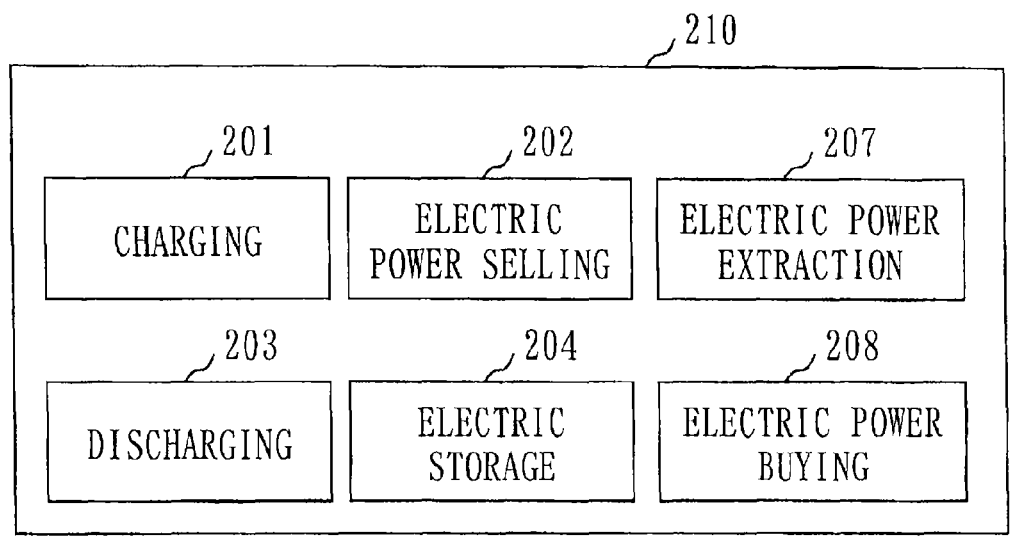
FIG. 8 is a diagram showing an input screen of an input unit of the in-vehicle electric power information management apparatus according to the second embodiment.

FIG. 8 is a diagram showing an input screen of the input unit 210 of the in-vehicle electric power information management apparatus 4.

Figure 9:
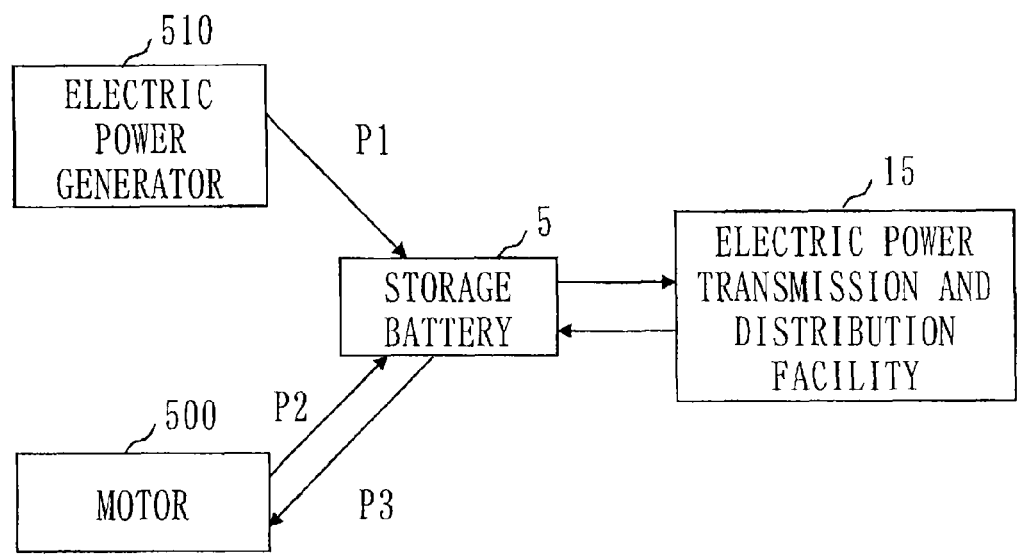
FIG. 9 is a diagram showing flow of electric powers of a vehicle 3 using the in-vehicle electric power information management apparatus according to the second embodiment.

FIG. 9 is a diagram showing flows of electric powers of the vehicle 3.

FIG. 10 is a diagram showing an example of a configuration of data in the electric power management database 90 of the management center 19. The other configurations are the same as those described with reference to FIGS. 1 to 6 in the first embodiment.

Referring to FIG. 7, the in-vehicle electric power information management apparatus 4 is constituted from the antenna 50, the wireless communication module 51 (in-vehicle communication module), the security module 52 (in-vehicle security module), the power meter 53 (in-vehicle power meter), and the control device 55 (in-vehicle electric power control device), as in FIG. 2.

The in-vehicle electric power information management apparatus 4 is connected to devices mounted on the vehicle 3 such as the input/output device 59 including the display unit and the input unit 210, the storage battery 5, the data recording device 56, the sensor 57, the motor 500, and the electric power generator 510.

The electric power cable 10 is connected to the power meter 53 through the power supply terminal 58. The power meter 53 is connected to the storage battery 5, the security module 52, the motor 500, the electric power generator 510, and the control device 55.

The power meter 53 may measure each of electric powers to be input and output through the power supply terminal 58, each of electric powers to be input to and output from the motor 500, electric power to be input from the electric power generator 510, and an amount of electric storage (electric charge) of the storage battery 5. The power meter 53 also functions as an adjustment valve for controlling an amount of inflow or outflow of each electric power and the electric storage. The control device 55 controls an input amount or an output amount of the electric power to be adjusted by the power meter 53.

The control device 55 is connected to the data recording device 56, the sensor 57, the security module 52, and the wireless communication module 51. The control device 55 controls operations of the power meter 53, the security module 52, and the wireless communication module 51.

The wireless communication module 51 is connected between the antenna 50 and the security module 52. The wireless communication module 51 performs dedicated short range wireless communication using the DSRC (dedicated short range communication) method or wireless communication using the wide area wireless LAN, for example.

The sensor 57 is constituted from an inertial navigation device, a satellite navigation device, a speedometer, a distance meter, an electric power meter, a brake depressing amount sensor, and an accelerator opening degree detector. The sensor 57 measures vehicle behavior data such as a position, a speed, a wheel rotation speed, a travel distance, a power consumption amount, a brake depressing amount, and an accelerator opening degree that change according to the behavior of the vehicle 3. The data recording device 56 records various information to be controlled by the control device 55. The vehicle behavior data measured by the sensor 57 is stored in the data recording device 56.

A portion of communication data received by the wireless communication module 51 is stored in the data recording device 56. A proper authentication code set in advance is stored in the internal storage device of the security module 52.

Through the power meter 53, the motor 500 receives electric power (electric power amount P3) from the storage battery 5, as shown in FIG. 9. The motor 500 rotates wheels of the vehicle 3, based on the electric power (electric power amount P3) supplied from the storage battery 5. The motor 500 performs power generation in which a rotational energy of the wheels of the vehicle 3 is converted to electric power by a regeneration brake, thereby generating electric power (electric power amount P2).

When the control device 55 detects that the brake has been depressed by the brake depressing amount sensor of the sensor 57 or the accelerator opening degree is zero (accelerator has not been depressed) by the accelerator opening degree detector of the sensor 57, the electric power (electric power amount P2) generated by the regeneration brake of the motor 500 is supplied to the storage battery 5, as shown in FIG. 9, through the power meter 53.

The power meter 53 measures the electric power (electric power amount P2) generated by the regeneration brake of the motor 500 and the electric power (electric power amount P3) to be supplied from the storage battery 5 to the motor 500.

The electric power generator 510 is constituted from a solar battery mounted on the roof of the vehicle 3 or an electric power generation device such as a thermoelectric device disposed in the vicinity of a radiator (radiator) of the vehicle 3 or the motor 500, and generates electric power (electric power amount P1) through power generation. The electric power (electric power amount P1) generated by the electric power generator 510 as shown in FIG. 9 is supplied to the power meter 53. The power meter 53 measures the electric power (electric power amount P1) generated by the electric power generator 510.

The control device 55 determines an electric power generation amount from measurement data of the electric power amounts P1 and P2 generated by the motor 500 and the electric power generator 510 and measured by the power meter 53, and records the electric power generation amount in the security-guarded storage device provided inside the security module 52.

In this case, the control device 55 determines an amount (P2+P1−P3) obtained by subtracting the electric power amount P3 to be used for rotating and driving the motor 500 from a sum of the electric power amount P2 generated by the motor 500 and the electric power amount P1 generated by the electric power generator 510 that have been measured by the power meter 53, as the electric power generation amount. To take an example, 40% of the electric power amount P2 generated by the motor 500 becomes the electric power amount P3 to be used for rotating and driving the motor 500 and the remaining 60% of the electric power amount P2 becomes an electric power generation amount to be stored in the storage battery 5.

The control device 55 cumulatively adds values of the electric power amounts sequentially determined from the electric power amounts P1, P2, and P3 measured by the power meter 53 for each predetermined sampling period to record the resulting value in the storage device of the security module 52, as electric power generation amount data. The storage device of the security module 52 is security-guarded so that when the storage device is removed or disassembled, a mechanical switch provided at the security module 52 operates to erase recording of the electric power generation amount data or destroy the data.

The electric power generation amount data may be stored outside the security module 52, such as in the data recording device 56 if the data recording device 56 is security-guarded so that falsification of the electric power generation amount data by a user may be prevented.

The in-vehicle electric power generation management apparatus 4 (in FIG. 7) is connected to the electric power information management apparatus 8 or the electric power information management apparatus 80, as described in the first embodiment, using FIG. 1.

A communication link security-protected by encryption is established between each of the electric power information management apparatuses 8 and 80 and the in-vehicle electric power information management apparatus 4. Further, when the power source 64 (in FIG. 3) of each of the electric power information management apparatuses 8 and 80 and the in-vehicle electric power information management apparatus 4 are electrically connected by the cable 10, a power link allowing transfer of electric power between the in-vehicle electric power information management apparatus 4 and each of the electric power information management apparatuses 8 and 80 is established. Delivery and receipt of electric power and communication data are thereby performed between each of the electric power information management apparatuses 8 and 80 and the in-vehicle electric power information management apparatus 4.

To take an example, by cryptographic communication between each of the electric power information management apparatuses 8 and 80 and the in-vehicle electric power information management apparatus 4, the security module 62 (in FIG. 3) obtains electric power generation amount data recorded in the storage device of the security module 52, an in-vehicle apparatus ID, an encrypted authentication code, and vehicle behavior data, and temporarily records the electric power generation amount data, the in-vehicle apparatus ID, the encrypted authentication code, and the vehicle behavior data in the internal storage device of the security module 62.

When the communication link and the power link between each of the electric power information management apparatuses 8 and 80 and the in-vehicle electric power information management apparatus 4 are established, the control device 55 of the in-vehicle electric power information management apparatus 4 performs display indicating that the communication link and the power link have been established, through the input/output device 59.

Next, operations of transfer and storage management of electric power between the in-vehicle electric power information management apparatus 4 and the electric power information management apparatus 8 or 80 in the electric power information management system 1000 in the second embodiment will be described. In the following description, operation of the electric power information management apparatus 80 will be described. It is assumed herein, however, that a similar operation can be performed by the electric power information management apparatus 8.

When a user (driver or passenger) on board the vehicle 3 visually recognizes the display indicating establishment of the communication link and the power link between the electric power information management apparatus 80 and the in-vehicle electric power information management apparatus 4 through the input/output device 59 of the in-vehicle electric power information management apparatus 4, the user performs input for execution of delivery and receipt of electric power between the in-vehicle electric power information management apparatus 4 and the electric power information management apparatus 80 through the input/output device 59.

Selection display prompting selection among six process modes of a charge process mode, an electric power selling process mode, an electric power extraction process mode, an electric storage process mode, and an electric power buying process mode is performed on the display unit of the input/output device 59, for example.

Selection buttons for modes including the charging 201, the electric power selling 202, electric power extraction 207, the discharging 203, the electric storage 204, electric power buying 208 are provided for the input unit 210 of the input/output device 59, as shown in FIG. 8. The selection buttons of the input unit 210 may also be provided within a display screen of the display unit.

The user selects and inputs one of the process modes of the charging 201, the electric power selling 202, the electric power extraction 207, the discharging 203, the electric storage 204, and the electric power buying 208 through one of the selection buttons on the input unit 200 of the input/output device 59.

The control device 55 of the in-vehicle electric power information management apparatus 4 controls operation of the power meter 53 according to the selected and input process mode, and transmits information on the selected and input process mode to the control device 65 (in FIG. 3) of the electric power information management apparatus 80 through the wireless communication modules 51 and 61. The control device 65 of the electric power information management apparatus 80 controls operation of the power meter 63, based on the received information on the process mode, thereby performing an operation process corresponding to one of the charge process mode, the electric power selling process mode, the electric power extraction process mode, the discharge process mode, the electric storage process mode, and the electric power buying process mode.

The selection buttons on the input unit 210 of the input/output device 59 of the in-vehicle electric power information management apparatus 4 shown in FIG. 7 may be provided for the input/output device 71 of the electric power information management apparatus 80. In this case, the input/output device 71 may perform operation processes similar to the selection display prompting selection of each process mode by the input/output device 59 and the selection and input process of each process mode through the selection button on the input unit 210 of the input/output device 59.

In this manner, delivery and receipt of electric power is performed between the storage battery 5 of the vehicle 3 and the power source 64 of the electric power information management apparatus 80, according to the selected and input process mode. The electric power information management apparatus 80 is connected to the electric power transmission and distribution facility 15 by the electric power cable 13, as shown in FIG. 3, and delivery and receipt of electric power corresponding to the selected and input process mode is performed between the electric power information management apparatus 80 and the electric power transmission and distribution facility 15.

Since the operation process of the electric power information management apparatus 80 for each of the charge process mode, the electric power selling process mode, and the discharge process mode is similarly performed as in the case of the delivery and the receipt and the storage management of electric power between the in-vehicle electric power information management apparatus 4 and the electric power information management apparatus 8 described in the first embodiment, description about the operation process will be omitted.

In the following description, the electric power extraction process mode, the electric power selling process mode, and the electric storage process mode using the electric power information management apparatus 80 will be described, using FIGS. 1 to 3 and FIGS. 7 to 10.

(1) Electric Power Extraction Process Mode

When the electric power extraction process mode is selected using the input unit 210 of the input/output device 59 of the vehicle 3 or the input/output device 71 of the electric power information management apparatus 80, the user of the in-vehicle electric power information management apparatus 4 sets and inputs a necessary extraction electric power amount, which is an electric power amount to be extracted from the electric power transmission and distribution facility 15 through the input unit 210 of the input/output device 59 or the input/output device 71 (in FIG. 3). Electric power extraction is thereby started.

Information on the necessary extraction electric power amount set and input through the input unit 210 of the input/output device 59 is transmitted to the control device 65 of the electric power information management apparatus 80 from the control device 55 of the in-vehicle electric power information management apparatus 4 by encrypted wireless communication between the wireless communication module 51 and the wireless communication module 61 through the antenna 50 and the antenna 20. Alternatively, the information on the necessary extraction electric power amount set and input through the input/output device 71 may be transmitted to the control device 65.

The security module 62 in FIG. 3 packetizes the information on the necessary extraction electric power amount, the in-vehicle apparatus ID obtained from the in-vehicle electric power information management apparatus 4 and the encrypted authentication code, and the base station ID set in advance and further encrypts these data using a seventh encryption key code, as electric power extraction data. The communication device 66 transmits this packetized and encrypted electric power extraction data to the management center 19.

The management center 19 in FIG. 1 decodes the electric power extraction data transmitted from the electric power information management apparatus 80 by the encryption processing apparatus 91, using an eighth encryption key code to reproduce the data on the necessary extraction electric power amount, the in-vehicle apparatus ID, and the encrypted authentication code and the base station ID. When the management center 19 confirms that the reproduced in-vehicle apparatus ID and the reproduced base station ID are proper ones set in advance, the management center 19 encrypts the authentication code reproduced by the encryption processing apparatus 91 using a ninth encryption key code as a key, and then transmits the encrypted authentication code to the authentication center 1 through the communication network 2.

The authentication center 1 in FIG. 1 decodes the encrypted authentication code transmitted from the management center 19 by the encryption processing apparatus 101, using a tenth encryption key code as a key, thereby reproducing the authentication code. The authentication center 1 compares the reproduced authentication code with the authentication code set in advance to check whether or not the reproduced authentication code is proper. When the authentication center 1 confirms that the reproduced authentication code is proper, the authentication center 1 transmits a data guarantee code encrypted by the encryption processing apparatus 101 using the tenth encryption key code as the key to the management center 19.

The management center 19 in FIG. 1 decodes and reproduces the encrypted data guarantee code received from the authentication center 1 by the encryption processing apparatus 91, using the ninth encryption key code as the key, to obtain the decoded data guarantee code. When the management center 19 obtains the decoded data guarantee code, the management center 19 refers to the electric power management database 90 using the in-vehicle apparatus ID of the in-vehicle electric power information management apparatus 4 as a key to obtain data on an electric storage amount associated with the in-vehicle apparatus ID recorded in the memory region 94 of electric storage amounts in the electric power management database 90.

The management center 19 obtains a differential electric power amount (A–B) by subtracting data on the necessary extraction electric power amount (B) received from the electric power information management apparatus 80 from the electric storage amount data (electric storage amount A) obtained from the electric power management database 90.

The management center 19 determines the obtained differential electric power amount (A–B) as new electric storage amount data, and sets an allowable extraction electric power amount to the value of the data on the necessary extraction electric power amount (B).

When the obtained differential electric power amount (A–B) is smaller than zero, the management center 19 sets the new electric storage amount data to zero, and sets the allowable extraction electric power amount to the value of the electric storage amount A.

The management center 19 overwrites and updates the electric storage amount data recording region associated with the in-vehicle apparatus ID in the electric power management database 90 by the new electric storage amount data.

The management center 19 encrypts data on the allowable extraction electric power amount and transmits the encrypted data on the allowable extraction electric power amount to the electric power information management apparatus 80 through the communication network 2.

The control device 65 (in FIG. 3) of the electric power information management apparatus 80 decodes the encrypted data on the allowable extraction electric power amount received from the management center 19 through the communication device 66 to obtain the allowable extraction electric power amount. The control device 65 of the electric power information management apparatus 80 controls the power meter 63, based on the obtained allowable extraction electric power amount, extracts electric power from the electric power transmission and distribution facility 15, and then supplies the electric power to the in-vehicle electric power information management apparatus 4.

The electric power extracted from the electric power transmission and distribution facility 15 is supplied to the power source 64 of the electric power information management apparatus 80 through the electric power cable 13 and the power supply terminal 68.

The electric power information management apparatus 80 in FIG. 3 supplies the electric power extracted from the electric power transmission and distribution facility 15 to the storage battery 5 of the vehicle 3 from the power source 64 of the electric power information management apparatus 80 through the power meter 63, the power supply terminal 69, the electric power cable 10, the power supply terminal 58 and the power meter 53 of the in-vehicle electric power information management apparatus 4. The storage battery 5 performs charging using the electric power supplied from the electric power information management apparatus 80.

The power meter 63 (in FIG. 3) of the electric power information management apparatus 80 measures an amount of the electric power to be supplied from the power source 64 to the power supply terminal 58 of the in-vehicle electric power information management apparatus 4 through the power supply terminal 69 and the electric power cable 10. Likewise, the power meter 53 of the in-vehicle electric power information management apparatus 4 measures an amount of the electric power to be supplied to the power supply terminal 58.

The control device 55 and the control device 65 respectively transmit data on the measurements by the power meter 63 and the power meter 53 to the wireless communication module 51 and the wireless communication module 61.

The wireless communication module 51 and the wireless communication module 61 mutually exchange the measurement data of the power meter 53 and the power meter 63, the in-vehicle apparatus ID, the encrypted authentication code, and the base station ID. Then, the wireless communication module 51 and the wireless communication module 61 respectively send the exchanged data to the control device 55 and the control device 65. With this arrangement, the control device 55 of the in-vehicle electric power information management apparatus 4 and the control device 65 of the electric power information management apparatus 80 confirm that there is not a discrepancy equal to or larger than a predetermined amount (prescribed amount of electric power loss set in advance based on power attenuation performance) between the measurement data on the electric power respectively obtained by the power meter 63 and the power meter 53.

When the control device 65 (in FIG. 3) of the electric power information management apparatus 80 confirms that the electric power supplied to the storage battery 5 of the vehicle 3 and measured by the power meter 63 has reached the allowable extraction electric power amount, the control device 65 completes extraction of the electric power from the electric power transmission and distribution facility 15.

The electric storage may be completed by confirming by the control device 55 of the in-vehicle electric power information management apparatus 4 that the electric storage amount supplied to the storage battery 5 has reached a set charge amount by measurement by the power meter 63.

When there is the discrepancy equal to or larger than the predetermined amount (prescribed amount of electric power loss set in advance based on power attenuation performance) between the measurement data of the power meter 63 and the measurement data of the power meter 53, between measurement data of the electric power meter 9 and the measurement data of the power meter 63, between the measurement data of the electric power meter 9 and measurement data of the electric storage device 26, or between the allowable extraction electric power amount and the respective measurement data of the power meter 53 and the power meter 63, the control device 55 and the control device 65 immediately stop electric power exchange between the electric power information management apparatus 80 and the in-vehicle electric power information management apparatus 4, and then transmit an error alarm to the management center 19.

(2) Electric Power Buying Process Mode

When the electric power buying process mode is selected using the input/output device 59 of the vehicle 3, the user of the in-vehicle electric power information management apparatus 4 sets and inputs a charge amount (set charge amount) for charging the storage battery 5 through the input unit 210 of the input/output device 59 to start the charging.

Referring to FIG. 3, electric power is supplied from the power source 64 of the electric power information management apparatus 8 to the storage battery 5 to charge the storage battery 5 via the in-vehicle electric power information management apparatus 4, through the power meter 63 and the power supply terminal 69 of the electric power information management apparatus 80, the electric power cable 10, and the power supply terminal 58 and the power meter 53 of the in-vehicle electric power information management apparatus 4, thereby performing charging of the storage battery 5.

In this case, the power source 64 of the electric power information management apparatus 80 receives supply of the electric power from the electric power transmission and distribution facility 15 through the electric power cable 13.

The power meter 63 (in FIG. 3) of the electric power information management apparatus 80 measures an amount of the electric power to be supplied from the power source 64 to the power supply terminal 58 of the in-vehicle electric power information management apparatus 4 through the power supply terminal 69 and the electric power cable 10. Likewise, the power meter 53 of the in-vehicle electric power information management apparatus 4 measures an amount of the electric power to be supplied from the power supply terminal 58.

When the control device 55 in FIG. 7 confirms that an amount of the electric power stored in the storage battery 5 measured by the power meter 53 has reached the set charge amount, the control device 55 completes the charging.

The charging may also be completed by confirming by the control device 65 of the electric power information management apparatus 80 that the amount of the electric power supplied to the storage battery 5 measured by the power meter 63 has reached the set charge amount.

The control device 55 and the control device 65 respectively transmit data obtained by the measurements by the power meter 63 and the power meter 53 to the wireless communication module 51 and the wireless communication module 61.

The wireless communication module 51 and the wireless communication module 61 exchange the measurement data of the power meter 53 and the power meter 63 by bi-directional communication, and respectively send the exchanged data to the control device 55 and the control device 65. With this arrangement, the control device 55 of the in-vehicle electric power information management apparatus 4 and the control device 65 of the electric power information management apparatus 80 confirm that there is not a discrepancy equal to or larger than the predetermined amount (prescribed amount of electric power loss set in advance based on the power attenuation performance)

between the measurement data of the electric power respectively obtained by the power meter 63 and the power meter 53.

The control device 65 (in FIG. 3) of the electric power information management apparatus 80 transmits to the management center 19 the data on the usage amount of the electric power supplied from the electric power transmission and distribution facility 15 to the electric power information management apparatus 80 from a start to completion of the charging through the communication device 66 and the communication network 2.

When there is the discrepancy equal to or larger than the predetermined amount (prescribed amount of electric power loss set in advance based on the power attenuation performance) between the measurement data of the power meter 53 and the measurement data of the power meter 63 or between measurement data of the electric power meter 9 and the measurement data of the power meter 63, the control device 55 and the control device 65 immediately stop electric power exchange between the electric power information management apparatus 80 and the in-vehicle electric power information management apparatus 4, and transmit an error alarm to the management center 19.

When the management center 19 in FIG. 1 receives the data on the usage amount of the electric power supplied from the electric power transmission and distribution facility 15 to the electric power information management apparatus 80 through the communication network 2, the management center 19 causes the accounting apparatus 92 to execute accounting of an electricity charge. The accounting apparatus 92 calculates the electricity charge, based on the usage amount of the electric power received from the electric power information management apparatus 80, and performs payment settlement processing of the electricity charge for the owner of the in-vehicle electric power information management apparatus 4 mounted on the vehicle 3 for which the charging has been performed.

(Electric Storage Process Mode)

When the electric storage process mode is selected using the input unit 210 (in FIG. 7) of the input/output device 59 of the vehicle 3 or the input/output device 71 (in FIG. 3) of the electric power information management apparatus 80, the user of the in-vehicle electric power information management apparatus 4 sets and inputs an electric storage amount for output for storing electric power supplied from the storage battery 5 of the vehicle 3 in the electric storage device 26 of the electric power transmission and distribution facility 15, thereby starting electric storage. The electric power transmission and distribution facility 15 may store the electric power supplied from the storage battery 5 in the electric storage device 26, or may transmit and distribute the electric power to a different electric power apparatus through a power grid.

The electric power is supplied to the power source 64 of the electric power information management apparatus 80 from the storage battery 5 through the power meter 53 and the power supply terminal 58 of the in-vehicle electric power information management apparatus 4, the electric power cable 10, the power supply terminal 69, and the power meter 63, as shown in FIG. 3. The electric power supplied to the power source 64 is sent to the electric power transmission and distribution facility 15 through the electric power cable 13. The electric power transmission and distribution facility 15 stores the electric power supplied from the electric power information management apparatus 80 through the electric power cable 13 in the electric storage device 26 (in FIG. 1) and measures an electric storage amount of the electric storage device 26.

When the control device 55 (in FIG. 7) of the in-vehicle electric power information management apparatus 4 confirms that an amount of the electric power discharged from the storage battery 5 and then stored in the electric storage device 26 has reached the set electric storage amount for output through measurement by the power meter 53, the control device 55 completes the electric storage.

The electric storage may also be completed by confirming by the control device 65 (in FIG. 3) of the electric power information management apparatus 80 that the amount of electric power discharged from the storage battery 5 and then stored in the electric storage device 26 has reached the set electric storage amount for output through measurement by the power meter 63.

The control device 65 of the electric power information management apparatus 80 generates encrypted electric storage data from measurement data of the electric power (electric storage amount) supplied from the in-vehicle electric power information management apparatus 4 and then measured by the power meter 63, using the security module 62.

The security module 62 in FIG. 3 performs packetization by associating the electric storage amount measured by the power meter 63, electric power generation amount data, the base station ID, the encrypted authentication code, and the in-vehicle apparatus ID of the in-vehicle electric power information management apparatus 4 connected by the power link, thereby generating packetized electric storage data. Then, by encrypting the generated electric storage data using the seventh encryption key code as a key, the security module 62 generates encrypted electric storage data.

In this case, the security module 62 compares electric power generation amount data temporarily recorded in the storage device thereof with the electric storage amount measured by the power meter 63 with a unified unit. When the electric storage amount is larger than an electric power generation amount of the electric power generation amount data, the security module 62 resets the electric power generation amount data temporarily recorded in the storage device to zero (to be recorded as new electric power generation amount data).

When the electric power generation amount of the electric power generation amount data is larger than the electric storage amount, the security module 62 uses the value of the electric storage amount measured by the power meter 63 as the electric power generation amount data to be packetized into the electric storage data. The security module 62 also records a value obtained by subtracting the value of the electric storage amount from the value of the electric power generation amount of the electric power generation data temporarily recorded in the storage device of the security module 62, as new electric power generation amount data.

The electric power generation amount data newly recorded in this security module 62 is transmitted to the storage device of the security module 52 by communication between the electric power information management apparatus 80 and the in-vehicle electric power information management apparatus 4. Then, the record in the storage device is updated as new electric power generation amount data.

The seventh encryption key code may be the same as a third encryption key code.

The electric storage data packet 300 as shown in FIG. 5 is constituted from a header, an in-vehicle apparatus ID, an encrypted authentication code, an electric storage amount, electric power generation data, and other data. By generating the electric storage data that has been encrypted and packetized by the security module 62 as described above, security protection of data on the electric storage amount may be ensured.

Electric storage data may also be generated by the security module 52. In this case, the security module 52 associates and packetizes the electric storage amount measured by the power meter 53, the base station ID obtained from the electric power information management apparatus 80, the authentication code obtained from the authentication center 1, and the in-vehicle apparatus ID, and encrypts these data, using a first encryption key code as a key. In this case, the authentication code is encrypted and security-protected. Thus, the authentication code encrypted in advance does not need to be used for the electric storage data.

The generated and encrypted electric storage data is transmitted to the management center 19 from the communication device 66 (in FIG. 3) through the communication cable 22.

The management center 19 decodes the encrypted electric storage data received from the electric power information management apparatus 80 by the encryption processing apparatus 91, using the eighth encryption key code as a key to reproduce the electric storage data. Then, the management center 19 temporarily stores the reproduced electric storage data in the storage device. When the management center 19 confirms that the base station ID included in the reproduced electric storage data is proper by referring to the base station ID stored in the internal storage device, the management center 19 encrypts the encrypted authentication code included in the reproduced electric storage data by the encryption processing apparatus 91, using the ninth encryption key code as the key, and then transmits the resulting code to the authentication center 1 through the communication network 2. The ninth encryption key code may be the same as the eighth encryption key code.

The authentication center 1 in FIG. 1 decodes the encrypted authentication code transmitted from the management center 19 by the encryption processing apparatus 101, using the tenth encryption key code as the key to reproduce the authentication code. The encryption processing apparatus 101 of the authentication center 1 compares the reproduced authentication code with the authentication code set in advance to check whether or not the reproduced authentication code is proper. When the encryption processing apparatus 101 confirms that the reproduced authentication code is proper, the authentication center 1 transmits to the management center 19 a data guarantee code encrypted by the encryption processing apparatus 101 using the tenth encryption key code as the key. The tenth encryption key code may be the same as a fourth encryption key code.

The management center 19 in FIG. 1 decodes the encrypted data guarantee code received from the authentication center 1 by the encryption processing apparatus 91, using the ninth encryption key code as the key, to obtain the decoded data guarantee code. When the management center 19 obtains the decoded data guarantee code, the management center 19 records the electric storage data received from the electric power information management apparatus 80 in the memory region of electric storage amounts in the electric power management database 90.

As shown in FIG. 10, an in-vehicle apparatus ID, an encrypted authentication code, an electric storage amount (example of unit of electric power amount: kwh), and an electric power generation amount are stored in the respective memory regions (the in-vehicle apparatus ID memory region 920, the encrypted authentication code memory region 93 of encrypted authentication codes, the electric storage amount memory region 94, and an electric power generation amount memory region 96) of the electric power management database 90 for each account number of an owner (user) of each in-vehicle electric power information management apparatus 4.

When electric power exchange is performed between the electric power information management apparatus 80 and the in-vehicle electric power information management apparatus 4 as in the case of the charge process mode, the control device 55 and the control device 65 perform monitoring such that there is not a discrepancy equal to or larger than the predetermined amount (prescribed amount of electric power loss set in advance based on the power attenuation performance) between the measurement data of the power meter 63 and measurement data of the power meter 53 or between measurement data of the electric power meter 9 and the measurement data of the power meter 63.

Vehicle behavior data stored in the data recording device 56 of the in-vehicle electric power information management apparatus 4 may be transmitted to the management center 19 through the electric power information management apparatus 80, in the electric storage process mode.

In this case, the electric power information management apparatus 80 incorporates the vehicle behavior data such as a position, a speed, a wheel rotation speed, a distance, and a power consumption amount that change according to the behavior of the vehicle 3 into the other data of the packetized electric storage data, thereby generating encrypted electric storage data. The generated electric storage data is transmitted to the management center 19.

The management center 19 in FIG. 1 decodes the encrypted electric storage data transmitted from the electric power information management apparatus 80 using the eighth encryption key code to reproduce the electric storage data including the vehicle behavior data. The management center 19 associates the reproduced electric storage data including the vehicle behavior data with the account number and the in-vehicle apparatus ID of the owner (user) of the in-vehicle electric power information management apparatus 4 to record the vehicle behavior data in the memory region of vehicle behavior data (95) in the electric power management database 90.

The management center 19 may perform point addition to the electric storage amount recorded in the electric power management database 90 and associated with the in-vehicle apparatus ID or may increase the electric storage amount according to the electric power generation amount associated with the in-vehicle apparatus ID recorded in the electric power management database 90.

To take an example, the management center 19 may perform the following service: the management center 19 compares each of a plurality of reference values set in advance in a stepwise manner by the manager with the electric power generation amount recorded in the electric power management database 90. When the electric power generation amount exceeds each reference value, point addition of increasing the electric storage amount recorded in the electric power management database 90 is performed. Alternatively, the management center 19 may perform the following service as well: a value is obtained by multiplying the electric power generation amount recorded in the electric power management database 90 by a predetermined ratio, and this obtained value is added to the electric storage amount recorded in the electric power management database 90 to increase the electric storage amount.

Selection buttons for electric storage amount inquiry, vehicle behavior data inquiry, and electric power generation amount inquiry and the like, for referencing and processing recorded data in the electric power management database 90, may be provided for the input unit 210 of the input/output device 59, as in FIG. 4 in the first embodiment.

The electric power information management apparatus 80 may be connected to a different electric power meter 9 through an electric power cable, like the electric power information management apparatus 8. In this case, the electric power information management apparatus 80 is connected to the electric power transmission and distribution facility 15 through the different electric power meter 9.

In each of the electric power information management apparatuses 8 and 80, the wireless communication module 61 and the power meter 63 may be configured to be disconnected as discrete elements. In this case, the security module 62 may be connected to each of the wireless communication module and the power meter 63 through a dedicated line. Alternatively, the security module may be provided for each of the wireless communication module 61 and the power meter 63 that have been disconnected, and both of the wireless communication module 61 and the power meter 63 may be connected by the security modules.

Further, like the electric power information management apparatus 80, the electric power information management apparatus 8 may be configured to allow storage of electric power in the electric power facility (electric power transmission and distribution facility 15) by accessing the electric power management database 90, based on data on an electric storage amount.

The electric power information management system 1000 in the second embodiment is configured to include: a selection unit (input unit 210) capable of selecting each of the electric power buying process mode and the electric power extraction process mode; the power meters (53, 63) each of which measures electric power data on electric power to be transmitted from the storage battery (5) of the vehicle (3) to the electric power facility (electric power transmission and distribution facility 15); the security modules (52, 62) each of which associates and encrypts identification information corresponding to the vehicle and the electric power data measured by a corresponding one of the power meters; the communication device (66) that transmits the identification information corresponding to the vehicle and the electric power data that have been encrypted by the security module to the electric power management database (90) to store the electric power data associated with the identification information in the electric power management database; and the electric power control devices (55, 65) that, upon receipt of electric power supply by purchase of necessary electric power from the electric power facility (electric power transmission and distribution facility 15) through the electric power facility terminal (electric power information management apparatuses 8 or 80), charges the supplied electric power to the storage battery of the vehicle when the electric power buying process is selected by the selection unit, and extracts necessary electric power from the electric power facility (electric power transmission and distribution facility 15) through the electric power facility terminal (electric power information management apparatuses 8 or 80), based on the electric power data stored in the electric power management database being associated with the identification information, and charges the extracted electric power to the storage battery when the electric power extraction process is selected by the selection unit. By this configuration, the data on the electric power to be transmitted from the storage battery of the vehicle to the electric power facility may be stored in the electric power management database, being associated with the identification information on the vehicle. In addition, the necessary electric power may be extracted from the electric power facility based on the electric power data stored in the electric power management database, and then the electric power may be supplied to the storage battery of the vehicle. Accordingly, the electric power once discharged to the electric power facility from the storage battery of the vehicle may be recharged to the storage battery of the vehicle through the electric power facility terminal at a different location.

With this arrangement, after electric power of the storage battery of the vehicle has been supplied to and has been stored in the electric power facility (electric power transmission and distribution facility 15) in advance, the electric power stored in advance may be extracted and may be recharged to the storage battery through a different electric power facility.

According to the electric power information management system 1000 in the above-mentioned embodiment, purchase of electric power (electric power buying) and extraction of electric power (electric power extraction) may be selected. Thus, an electric power utilization service that is flexible according to the utilization form of a user may be provided.

According to the electric power information management system 1000 in the above-mentioned embodiment, data on electric power obtained by power generation by the power generator mounted on the vehicle 3 or the regeneration brake of the motor may be stored in the electric power management database. Thus, data on an electric power generation amount to be quantitatively obtained during running of the vehicle 3 may be managed. With this arrangement, there may be obtained various opportunities for giving the user of the vehicle 3 a user incentive for promoting eco-friendly vehicle and eco-friendly running, such as point provision or achievement of a service of increasing electric power supplied to and then stored in the electric power facility (electric power transmission and distribution facility 15) according to the power generation amount.

As in the first embodiment, by connecting an electric power information management apparatus of a different type other than the in-vehicle electric power information management apparatus 4 to the electric power facility terminal (electric power information management apparatus 80), electric power may be extracted from the electric power facility terminal (electric power information management apparatus 8 or 80) and may be charged to the electric power information management apparatus of the different type. The storage battery 5, the power meter 53, the security module 52, the antenna 50, the power supply terminal 58, the wireless communication module 51, the control device 55, and the input/output device 59 as shown in FIG. 2 should be provided for this electric power information management apparatus of the different type. This electric power information management apparatus of the different type may be formed by providing a storage battery in a transportable computer such as a portable terminal or a portable computer (e.g., a personal computer).

In the above-mentioned first and second embodiments, description was directed to the in-vehicle electric power information management apparatus 4 and the electric power information management apparatuses 8 and 80. The functions of these electric power information management apparatuses may also be recognized as an electric power information management method.

DESCRIPTION OF REFERENCE SIGNS

1: authentication center, 2: communication network, 3: vehicle, 4: in-vehicle electric power information management apparatus, 5: storage battery, 6: structure, 7: electric power generation device, 8: electric power information management apparatus (electric power facility terminal), 9: electric power meter, 10, 11, 12, 13, 14, 31: electric power cable, 15: electric power transmission and distribution facility (electric power facility), 19: management center, 20: antenna, 21, 22, 23: communication cable, 26: electric storage device, 50: antenna, 51: wireless communication module (in-vehicle communication module), 52: security module (in-vehicle security module), 53: power meter (in-vehicle power meter), 55: control device (in-vehicle electric power control device), 56: data recording device, 57: sensor, 59: input/output device (in-vehicle input/output device), 61: wireless communication module (electric power facility terminal communication module), 62: security module (electric power facility terminal security module), 63: power meter (electric power facility terminal power meter), 65: control device (electric power facility terminal electric power control device), 66: communication device, 80: electric power information management apparatus (different electric power facility terminal at different location), 90: electric power management database, 200: input unit, 210: input unit, 500: motor, 510: electric power generator, 1000: electric power information management system

The invention claimed is:

1. An in-vehicle apparatus comprising:
a power meter that measures electric power data on electric power to be supplied from a storage battery of a vehicle to an electric power facility external to the vehicle;
an in-vehicle security module that associates and encrypts identification information corresponding to the vehicle and the electric power data measured by the power meter supplied from the storage battery of the vehicle to the electric power facility external to the vehicle;
a communication device that transmits to an electric power management database external to the vehicle the identification information corresponding to the vehicle and the electric power data that have been encrypted by the security module to store an electric storage amount based on the electric power data associated with the identification information in the electric power management database;
an input unit that receives as input an electric power amount to be charged into the storage battery of the vehicle; and
an in-vehicle control device that extracts from either one of the electric power facility and another electric power facility which is different from the electric power facility electric power of the electric power amount that has been input to the input unit, based on the electric storage amount associated with the identification information and stored in the electric power management database, and supplies extracted electric power to the storage battery of the vehicle corresponding to the identification information,
wherein the power meter can be connected to each of a plurality of electric power information management apparatuses external to the vehicle, each having a power meter external to the vehicle, a security module external to the vehicle, and a communication device external to the vehicle,
wherein the security module communicates with a communication device external to the vehicle of an electric power information management apparatus among the plurality of electric power information management apparatuses, thereby checking whether the electric power information management apparatus is a proper apparatus with which to communicate and to perform electric power transfer,
wherein when the security module has determined that the electric power information management apparatus is the proper apparatus, the control device connects the power meter to the electric power facility external to the vehicle to allow electric power to be transmitted to the electric power facility external to the vehicle via the power meter of the electric power information management apparatus determined as the proper apparatus,
wherein the security module communicates with another communication device external to the vehicle of another electric power information management apparatus among the plurality of electric power information management apparatuses, thereby checking whether the another electric power information management apparatus is a proper apparatus with which to communicate and to perform electric power transfer, and
wherein when the security module has determined that the another electric power information management apparatus is the proper apparatus, the control device connects the power meter to the another electric power facility external to the vehicle to allow electric power to be charged from the another electric power facility external to the vehicle via the power meter of the another electric power information management apparatus determined as the proper apparatus.

2. The in-vehicle apparatus according to claim 1, wherein the security module verifies that the electric power information management apparatus is the proper apparatus with which to communicate and to perform electric power transfer by communicating with an authentication center.

3. The in-vehicle apparatus according to claim 1,
wherein the security module encrypts vehicle behavior data obtained from a sensor mounted on the vehicle, and
wherein the communication device transmits to the electric power management database the identification information corresponding to the vehicle, the electric power data, and the vehicle behavior data that have been encrypted by the security module to store the electric power data associated with the identification information in the electric power management database and to register the vehicle behavior data in the electric power management database by associating the vehicle behavior data with the identification information.

4. The in-vehicle apparatus according to claim 1,
wherein the power meter measures electric power data on electric power generated by the vehicle and to be transmitted to the electric power facility from the vehicle,
wherein the security module associates and encrypts the identification information corresponding to the vehicle and an electric power generation amount based on the electric power data obtained by the measurement by the power meter, and
wherein the communication device transmits to the electric power management database the identification information corresponding to the vehicle and the electric power generation amount that have been encrypted.

5. The in-vehicle apparatus according to claim 1,
wherein the input unit has a selection unit capable of selecting each of an electric storage process mode, an electric power buying process mode, and a charging process mode, and receives as input an electric power amount in each of the electric storage process mode, the electric power buying process mode, and the charging process mode,
wherein when the electric storage process mode is selected by the selection unit, the input unit supplies electric power stored in the storage battery of the vehicle to the electric power facility external to the vehicle to start storing electric power externally to the vehicle,
wherein when the electric power buying process mode is selected by the selection unit, the input unit buys electric power of the electric power amount that has been input to receive a supply of electric power from either of the electric power facility and the another electric power facility which is different from the electric power facility and to start charging the electric power supplied into the storage battery of the vehicle, and
wherein when the charging process mode is selected by the selection unit, the input unit extracts from either of the electric power facility and the another electric power facility which is different from the electric power facility electric power of the electric power amount that has been input, based on the electric storage amount associated with the identification information and stored in the electric power management database to start charging extracted electric power into the storage battery of the vehicle corresponding to the identification information.

* * * * *